United States Patent
Brumley et al.

(10) Patent No.: US 11,991,586 B2
(45) Date of Patent: May 21, 2024

(54) TECHNIQUES FOR CHANGING FREQUENCY OF RANGING BASED ON LOCATION OF MOBILE DEVICE

(71) Applicant: Apple Inc., Cupertino, CA (US)

(72) Inventors: Robert W. Brumley, Menlo Park, CA (US); Peter C. Tsoi, San Jose, CA (US); Yagil Burowski, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 17 days.

(21) Appl. No.: 17/112,566

(22) Filed: Dec. 4, 2020

(65) Prior Publication Data

US 2022/0078578 A1    Mar. 10, 2022

Related U.S. Application Data

(60) Provisional application No. 63/074,750, filed on Sep. 4, 2020.

(51) Int. Cl.
*H04W 4/02* (2018.01)
*H04W 72/0446* (2023.01)

(52) U.S. Cl.
CPC ....... *H04W 4/023* (2013.01); *H04W 72/0446* (2013.01)

(58) Field of Classification Search
CPC .......................... H04W 4/023; H04W 72/0446
See application file for complete search history.

(56) References Cited

U.S. PATENT DOCUMENTS 11,191,042 B2 * 11/2021 Qi .......................... H04W 4/021
2006/0025154 A1 * 2/2006 Alapuranen ............ H04L 67/52
455/457

(Continued)

FOREIGN PATENT DOCUMENTS

EP      3629621       4/2020
WO   2017196583      11/2017

OTHER PUBLICATIONS

International Search Report and Written Opinion issued in PCT Application No. PCT/US2021/048113, dated Feb. 8, 2022 in 19 pages.

(Continued)

*Primary Examiner* — Steven S Kelley
(74) *Attorney, Agent, or Firm* — Kilpatrick Townsend & Stockton LLP

(57) ABSTRACT

Certain embodiments are directed to techniques (e.g., a device, a method, a memory or non-transitory computer readable medium storing code or instructions executable by one or more processors) for communication techniques between an electronic device (e.g., a smart speaker, a smart TV, a smart appliance, etc.) and one or more mobile devices (e.g., a smartphone, a tablet, a wearable device etc.). Techniques can vary the rate the mobile device responds to ranging messages from the smart speaker based on one or more factors. These factors can include a state of the mobile device (e.g., awake or asleep), mobile device orientation (e.g., face down), application state (e.g., music App active), motion of the mobile device (e.g., at rest for period of time), and a range (distance/angle) between the mobile device and the speaker to conserve battery life. The range to the electronic device can activate one or more smart speaker features on the mobile device.

18 Claims, 14 Drawing Sheets

(56) References Cited

U.S. PATENT DOCUMENTS

| | | | |
|---|---|---|---|
| 2009/0099812 A1* | 4/2009 | Kahn | H04M 1/72403 |
| | | | 702/152 |
| 2011/0110340 A1* | 5/2011 | Lakkis | H04W 74/0816 |
| | | | 370/336 |
| 2011/0228866 A1* | 9/2011 | Nagai | G08G 1/163 |
| | | | 375/259 |
| 2013/0113655 A1* | 5/2013 | Shen | H04W 4/023 |
| | | | 342/357.31 |
| 2015/0168536 A1* | 6/2015 | Banin | H04W 4/023 |
| | | | 455/456.2 |
| 2016/0205501 A1* | 7/2016 | Lee | H04W 12/40 |
| | | | 455/457 |
| 2017/0237673 A1* | 8/2017 | Law | H04W 4/023 |
| | | | 370/338 |
| 2019/0222959 A1* | 7/2019 | Duan | H04W 56/00 |
| 2020/0106877 A1 | 4/2020 | Ledvina et al. | |
| 2020/0137676 A1* | 4/2020 | Yoon | H04W 64/006 |
| 2020/0146060 A1* | 5/2020 | Jung | H04W 4/40 |
| 2020/0228943 A1* | 7/2020 | Martin | H04W 4/80 |
| 2022/0201428 A1* | 6/2022 | Ertan | G06F 21/44 |
| 2022/0210620 A1* | 6/2022 | Wahl | G01S 5/10 |
| 2022/0299617 A1* | 9/2022 | Ahmed | H04W 72/542 |
| 2022/0394794 A1* | 12/2022 | Zhang | H04W 76/15 |

OTHER PUBLICATIONS

Invitation to Pay Additional Fees and, Where Applicable, Protest Fee issued in PCT Application No. PCT/US2021/048113, dated Dec. 13, 2021 in 12 pages.

International Preliminary Report on Patentability issued in PCT Application No. PCT/US2021/048113, dated Mar. 16, 2023 in 14 pages.

* cited by examiner

TECHNIQUES FOR CHANGING FREQUENCY OF RANGING BASED ON LOCATION OF MOBILE DEVICE

CROSS-REFERENCES TO RELATED APPLICATIONS

This application claims the benefit of U.S. Provisional Patent Application No. 63/074,750, entitled "Techniques For Changing Frequency of Ranging Based on Location of Mobile Device," filed Sep. 4, 2020, hereby incorporated by reference in its entirety and for all purposes.

BACKGROUND

Current electronic devices (e.g., smart speaker devices) can use Bluetooth to detect a nearby mobile device for transferring media content and phone calls to the electronic device. This transfer is often called a "hand-off". As the mobile device is moved within a predetermined distance, the media content played on the mobile device can hand-off to the smart speaker device. New multimedia speakers have additional capabilities such as ultra-wideband (UWB) chips to conduct ranging with one or more mobile devices. These additional capabilities can provide more accurate ranging for handoff exchanges and allow for other range-based features. Smart speakers can transmit ranging messages frequently as these devices are frequently not power limited. However, mobile devices that can respond to these messages can be power constrained and continuous ranging with the smart speaker can drain battery life.

BRIEF SUMMARY

Certain embodiments are directed to techniques (e.g., a device, a method, a memory or non-transitory computer readable medium storing code or instructions executable by one or more processors) for communication techniques between an electronic device (e.g., a smart speaker, a smart TV, a smart appliance, etc.) and one or more mobile devices (e.g., a smartphone, a tablet, a wearable device etc.). Techniques can vary the rate (frequency) the mobile device sends ranging messages to the electronic device (e.g., in response to messages from the smart speaker) based on one or more factors. These factors can include a state of the mobile device (e.g., awake or asleep), mobile device orientation (e.g., face down), application state (e.g., music App active), motion of the mobile device (e.g., at rest for period of time), and a relative position (distance/angle) between the mobile device and the speaker to conserve battery life.

The electronic device can transmit a ranging request at a consistent rate (e.g., a 10 Hz cycle). The mobile device can transmit a response to the ranging request at a variable rate based on one more factors, e.g., distance to the electronic device. The variable rate of response helps preserve battery life for the mobile device under conditions when more rapid ranging is not required, but maintain the high fidelity for ranging for a great user experience. The mobile device can determine an initial distance to the electronic device, e.g., using a ranging protocol (e.g., via UWB) or via other wireless communication (e.g., Bluetooth). In various embodiments, outside a first predetermined distance (e.g., 3.5 meters), the ranging can occur at a first rate (e.g., a continuous 0.5 Hz rate). The ranging rate can also be determined based on other factors, such as the status of the mobile device (e.g., the mobile device is awake) and application state (e.g., music application is running). Between a first range (e.g., 3 meters) and a second range (e.g., 0.5 meters) from the smart speaker, the mobile device can conduct ranging at a second rate (e.g., a continuous 2 Hz rate). Inside the second range (e.g., 0.5 meters), the mobile device can conduct ranging at a third rate (e.g., a continuous 10 Hz rate).

The mobile device can achieve the varying rate by selecting a response slot from multiple response slots following a ranging request by the electronic device. By skipping one or more response slots, the variable rate can be achieved.

The ranging functionality can be implemented in combination with another wireless protocol, which can establish an initial communication session, e.g., to perform authentication and/or exchange ranging settings. Additional wireless protocols can also be used, e.g., for transmission of content from one device to the other. For instance, a video or audio file can be transferred from one device to the other after ranging has been performed.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

Figure 1:
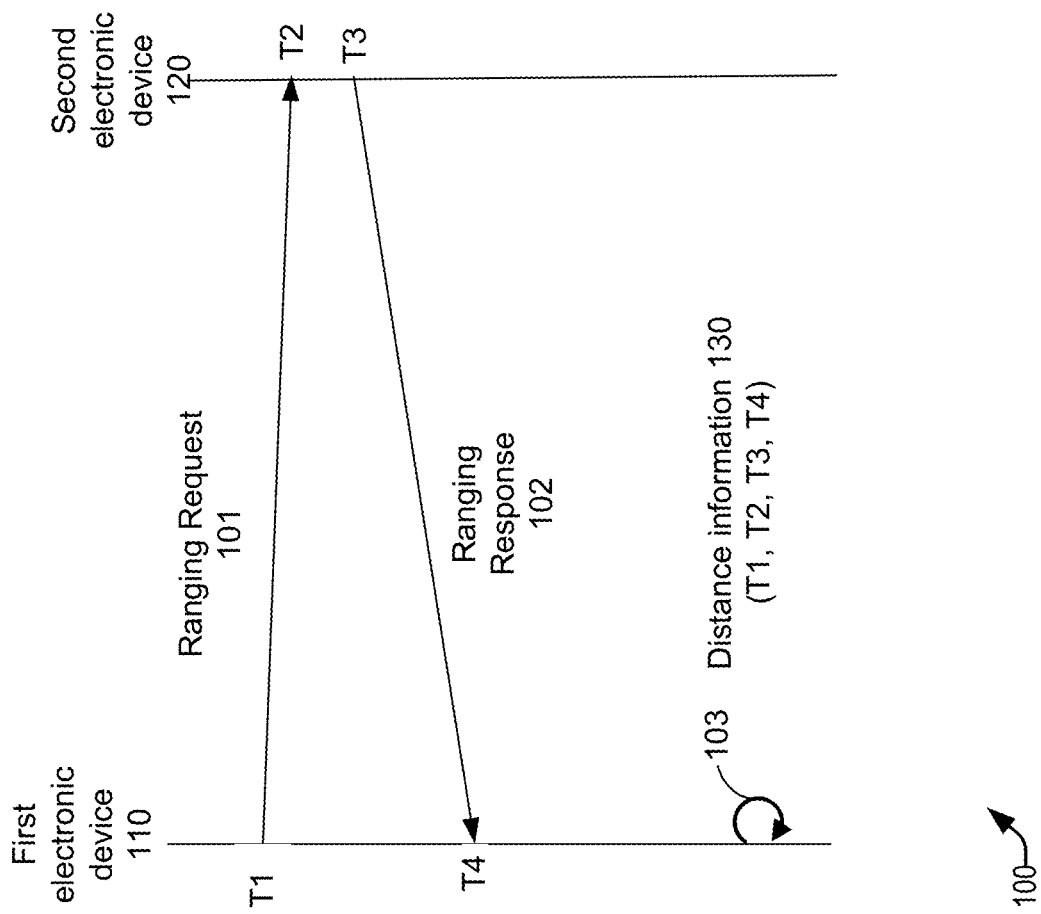
FIG. 1 shows a sequence diagram for performing a ranging measurement between an electronic device and a mobile device according to embodiments of the present disclosure.

Like reference, symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc., or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Certain embodiments are directed to techniques (e.g., a device, a method, a memory or non-transitory computer readable medium storing code or instructions executable by one or more processors) for communication techniques between an electronic device (e.g., a smart speaker, a smart TV, a smart appliance, etc.) and one or more mobile devices (e.g., a smartphone, a tablet, a wearable device etc.). Techniques can vary the rate the mobile device responds to ranging messages from the electronic device (e.g., in response to messages from the smart speaker) based on one or more factors. These factors can include a state of the mobile device (e.g., awake or asleep), mobile device orientation (e.g., face down), application state (e.g., music App active), motion of the mobile device (e.g., at rest for period of time), and a relative position (distance/angle) between the mobile device and the speaker to conserve battery life.

Mobile devices can provide an audio stream (e.g., music, podcast, video soundtrack, audio phone call) to one or more electronic devices (e.g., smart speakers). Audio can be passed from a mobile device to the electronic device through a "hand-off" procedure where the audio will stop on the mobile device and begin on the electronic device. Some smart speakers can conduct a hand-off by physically tapping a housing of the smart speaker with the mobile device. For some devices and software configurations, hand-off can be accomplished by hovering the mobile device within close proximity to the smart speaker. Proximity hand-off uses a proprietary protocol stack/suite that allows wireless streaming between devices of audio, video, device screens, and photos, together with related metadata. The hand-off procedure can also be used for phone calls. For example, by tapping the mobile device on the smart speaker during the phone call, the speakers and microphone on the smart speaker can be used for the phone call. By tapping the device again, the audio or phone call can be transferred back to the mobile device. A similar process can be used to hand-off video to a smart TV, a smart appliance, a computer, a tablet computer, or smart phone.

The mobile devices can also be used to control one or more features of the electronic device. For example, a graphical user interface can be provided on the mobile device that allows for traditional audio controls such as volume, fast forward, reverse, pause, stop, next track etc. of the audio output of the electronic device. The user interface also allows for selecting a specific track to play on the mobile device. In some embodiments, multiple users can interact with the electronic device by creating a virtual playlist with songs selected using multiple mobile devices.

The incorporation of ranging features in the smart speaker can allow for a broader range of capabilities of the smart speaker. For example, the mobile device can provide a more efficient handoff using the ranging features provided by new wireless protocols such a UW/B. The mobile device can detect a range to the smart speaker and can provide a user interface when the mobile device is within a certain distance from the smart speaker.

Smart speakers can be used as a hub for smart devices (e.g., smart lights, smart locks, smart outlets, thermostats, security cameras, etc.) In some embodiments, the mobile device can be used to program or control one or more smart devices. By providing the smart speaker the distance to the mobile device, the smart speaker can provide controls to the mobile device for relevant smart devices in a vicinity of the mobile device.

By incorporating ranging into the smart speaker, the calculated range information can be used to determine a user's interest in operating the smart speaker. The interest can be measured by calculating an angle of arrival of messages from the smart speaker to antennas on the mobile device. Orientation data received from other sensors on the mobile device can measure an orientation of the mobile device. The mobile device can use the angle of arrival data combined with the orientation data to determine if a user is directing the mobile device toward the smart speaker (or within a threshold of the smart speaker device). The angle of arrival and orientation data can be used as an indicator of user interest in the information provided by the smart speaker.

As another example, multiple passive smart speakers can be used at a location to determine a precise location of the mobile device. Using the techniques described herein, a mobile device can use triangulation techniques using calculated angles of arrival from two or more smart speakers at known locations to determine a precise location of the mobile device. This can be done passively, so the mobile device does not need to transmit any signals.

A brief review of ranging and triangulation techniques follows below.

I. Ranging/Triangulation Techniques

A mobile device or smart speaker can include circuitry for performing ranging measurements. Such circuitry can include one or more dedicated antennas (e.g., three antennas) and circuitry for processing measured signals. The ranging measurements can be performed using the time-of-flight of pulses between the mobile device and the smart speaker. In some implementations, a round-trip time (RTT) is used to determine distance information, e.g., for each of the antennas. In other implementations, a single-trip time in one direction can be used. The pulses may be formed using ultra-wideband (UWB) radio technology.

A. Sequence Diagram

FIG. 1 shows a sequence diagram 100 for performing a ranging measurement between an electronic device and a mobile device according to embodiments of the present disclosure. The electronic device and the mobile device may belong to two different users. In various embodiments, the mobile device 110 can be an electronic device (e.g., a smart speaker, a smart TV, a smart appliance, etc.). In various embodiments, the electronic device and the mobile device can be electronically linked through a pairing process. As described in more detail later, such an identifier can be used for authentication purposes, e.g., so ranging is not performed with unknown devices. Although FIG. 1 shows a single measurement, the process can be repeated to perform multiple measurements over a time interval as part of a ranging session, where such measurements can be averaged or otherwise analyzed to provide a single distance value, e.g., for each antenna.

In various embodiments, a more complex exchange can be used. For example, the electronic device can send out a polling message and open up a plurality of response time slots. Inside each response time slot there can be one, two, or three packet exchanges. The additional packet exchanges can correct for ranging errors (e.g., differential clock rates, multipath propagation) in order to generate more accurate relative position (distance/angle).

A first electronic device 110 (e.g., a smart speaker, a smart TV, a smart appliance, etc.) can initiate a ranging measurement (operation) by transmitting a ranging request 101 to a second electronic device 120 (e.g., a mobile device). Ranging request 101 can include a first set of one or more pulses. The ranging measurement can be performed using a ranging wireless protocol (e.g., ultra-wideband (UWB)). The ranging measurement may be triggered in various ways, e.g., based on user input and/or authentication using another wireless protocol, e.g., Bluetooth Low Energy (BLE).

At T1, the first electronic device 110 transmits ranging request 101. At T2, the second electronic device 120 receives ranging request 101. T2 can be an average received time when multiple pulses are in the first set. The second electronic device 120 can be expecting the ranging request 101 within a time window based on previous communications, e.g., using another wireless protocol. The ranging wireless protocol and the another wireless protocol can be synchronized so that second electronic device 120 can turn on the ranging antenna(s) and associated circuitry for a specified time window, as opposed to leaving them on for an entire ranging session.

In response to receiving the ranging request 101, second electronic device 120 can transmit ranging response 102. As shown, ranging response 102 is transmitted at time T3, e.g., a transmitted time of a pulse or an average transmission time for a set of pulses. T2 and T3 may also be a set of times for respective pulses. Ranging response 102 can include times T2 and T3 so that the first electronic device 110 can compute distance information. As an alternative, a delta between the two times (e.g., T3–T2) can be sent. The ranging response 102 can also include an identifier for the first electronic device 110, an identifier for the second electronic device 120, or both.

At T4, the first electronic device 110 can receive ranging response 102. Like the other times, T4 can be a single time value or a set of time values.

At 103, the first electronic device 110 computes distance information 130, which can have various units, such as distance units (e.g., meters) or as a time (e.g., milliseconds). Time can be equivalent to a distance with a proportionality factor corresponding to the speed of light. In some embodiments, a distance can be computed from a total round-trip time, which may equal T2−T1+T4−T3. In some embodiments, the processing time for the second electronic device 120 can also be subtracted from the total round-trip time. More complex calculations can also be performed, e.g., when the times correspond to sets of times for sets of pulses and when a frequency correction is implemented. Also, additional packet exchanges can be included to correct for ranging errors such as difference between device clock frequencies.

However, ranging may not be required and may be difficult in certain applications. As the number of participating devices increases the complexity of the ranging sessions also increases due to potential of collisions between ranging packets in the same frequency band. In addition, other ranging techniques can be complicated when one or more mobile devices enter or leave the communication session. In addition, multiple beacons can be used for precise position location of mobile devices with the receiving devices in a passive receive only mode.

B. Triangulation to Determine Angle of Arrival

Figure 2:
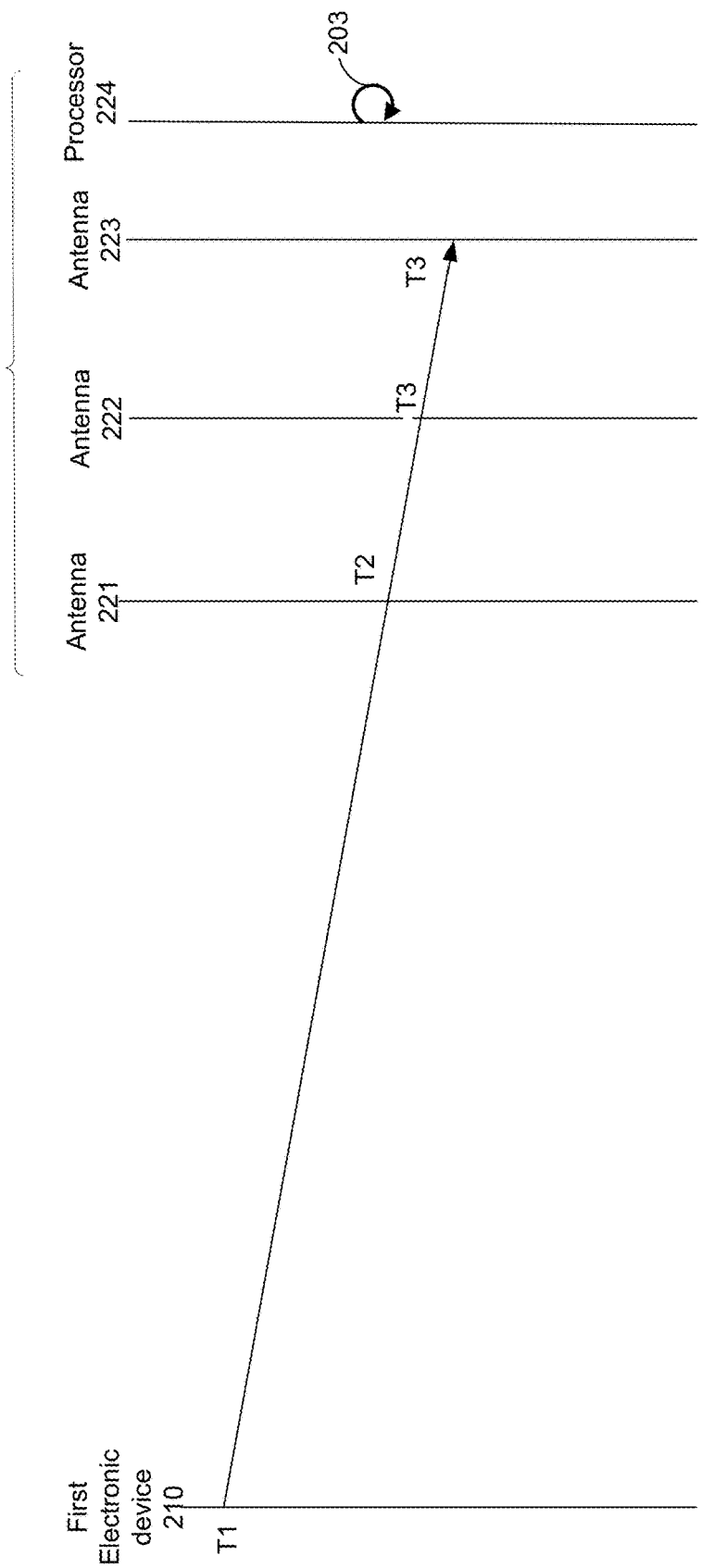
FIG. 2 illustrates a sequence diagram involving a first electronic device (e.g., a smart speaker, a smart TV, a smart appliance, etc.) and a mobile device with a multiple-antenna array.

FIG. 2 shows a sequence diagram 200 of a ranging operation involving a first electronic device 210 (e.g., a smart speaker, a smart TV, a smart appliance, etc.) and a mobile device 220 having three antennas 221, 222, and 223 according to embodiments of the present disclosure. Antennas 221, 222, 223 can be arranged to have different orientations, e.g., to define a field of view for calculating angle of arrival or for performing ranging measurements.

In this example of FIG. 2, each of antennas 221, 222, 223 receives a packet (including one or more pulses) that is transmitted by the first electronic device 210 (e.g., a smart speaker, a smart TV, a smart appliance, etc.). These packets can transfer information to the mobile device 220 such as links to information or ranging requests. The link can be received by the mobile device. The reception of the packets can trigger one or more actions on the mobile device 220. The actions can include initiating a hand-off or enabling a user interface on the mobile device 220.

Mobile device 220 can have multiple antennas, which can be used to determine angular information related to an orientation of mobile device 220 relative to first electronic device 210. The packets can be received at times T2, T3, and T4, by antennas 221, 222, and 223 respectively. Thus, the antenna(s) (e.g., UWB antennas) of mobile device 220 can listen at substantially the same time. In various embodiments, each of the antennas 221, 222, and 223 can respond independently.

Processor 224 of mobile device 220 can calculate an angle of arrival to the first electronic device 210. Processor 224 can receive, at 203, the time of arrival of the packets from the antennas 221, 222, and 223. The mobile device 220 circuitry (e.g., UWB circuitry) can analyze the received signals from antennas 221, 222, 223. As described later, processor 224 can be an always-on processor that uses less power than an application processor that can perform functionality that is more general. The processor 224 can know the geometry of the three antennas on the phone. The processor 224 can also know the orientation of the mobile device 220 from one or more sensors on the mobile device 220 (e.g., accelerometer, gyroscope, and compass). With the known orientation of the antennas 221, 222, and 223, and the known orientation of the mobile device 220, the processor can use the times of arrival T2, T3, and T4 to calculate an angle of arrive of the packet to the beacon device 210.

Accordingly, a mobile device can have multiple antennas to perform triangulation. The separate measurements from different antennas can be used to determine a two-dimensional (2D) position, as opposed to a single distance value that could result from anywhere on a circle/sphere around the mobile device. The two-dimensional (2D) position can be specified in various coordinates, e.g., Cartesian or polar, where polar coordinates can comprise an angular value and a radial value.

II. Ranging Techniques for Smart Speaker

An electronic device 310 (e.g., a smart speaker, a smart TV, a smart appliance, etc.) can interact with one or more mobile devices for playing audio information. The electronic device can receive its power from an alternating power source via a power cord. Generating and transmitting the ranging packets consume power. In contrast, the one or more mobile devices 320a, 320b, 320c, and 320d receives its power via a battery. The mobile device also consumes power by generating and transmitting response packets. The power source of the mobile device is generally more limited than the electronic device. Therefore, the techniques disclosed herein provide for varying the rate of responding by the mobile device to conserve battery power.

The electronic device 310 can conduct ranging with multiple mobile devices (e.g., mobile devices 320a, 320b, 320c, and 320d). Although four devices are illustrated, the disclosed techniques can be used by one mobile device to several mobile devices within communication range of the electronic devices.

Communication techniques that require direct links are inefficient because of the power and time required for separate communications for multiple devices. The disclosed techniques allow for communication techniques between multiple devices using a single transmitting device (e.g., a smart speaker, a smart TV, a smart appliance, etc.).

Figure 3:
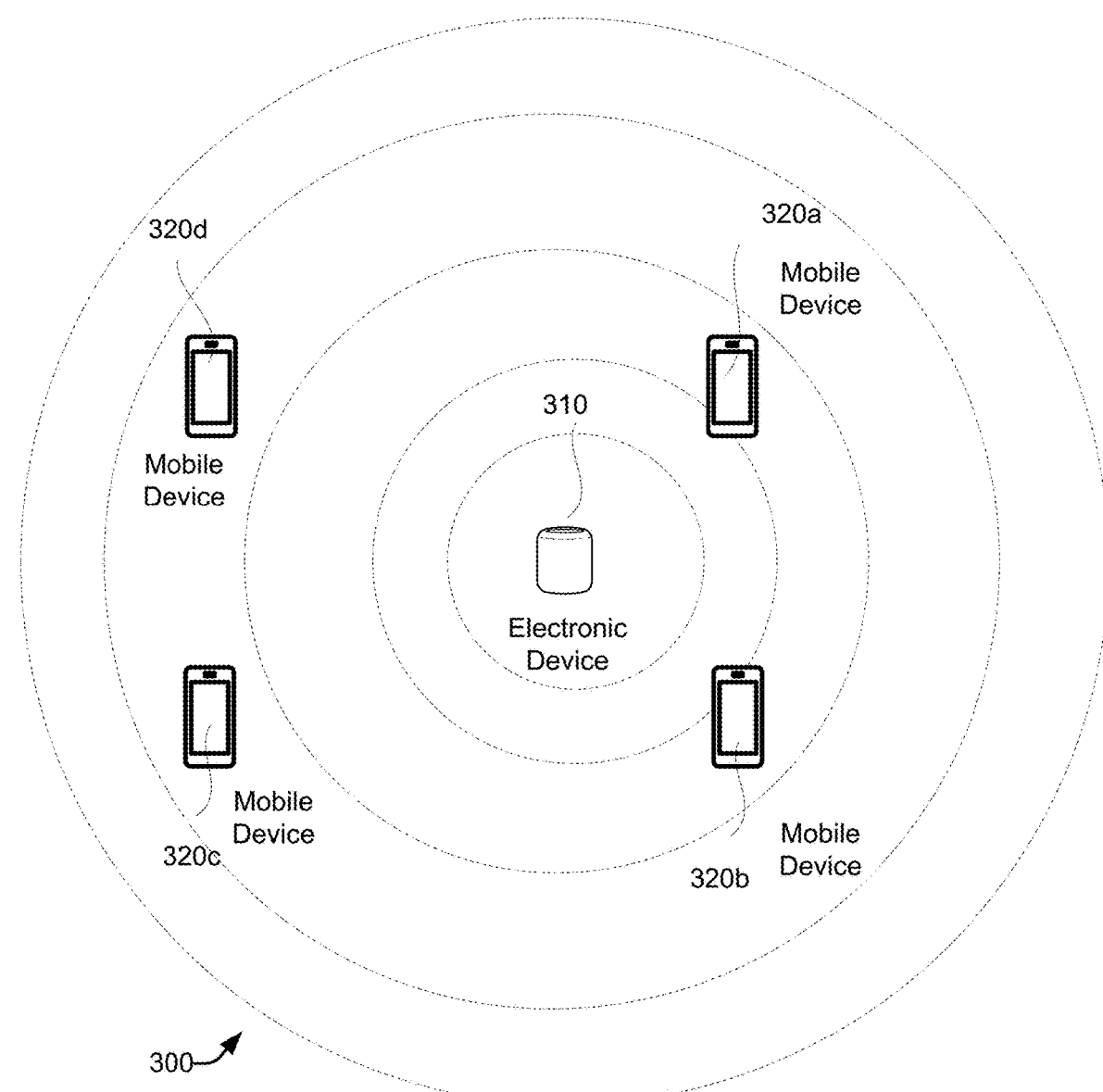
FIG. 3 illustrates schematically an example of ranging techniques involving an electronic device (e.g., a smart speaker, a smart TV, a smart appliance, etc.) and multiple mobile devices.

FIG. 3 illustrates a communication group 300 involving an electronic device 310 (e.g., a smart speaker, a smart TV, a smart appliance, etc.) and multiple mobile devices 320a, 320b, 320c, and 320d, but only one mobile device may be present. The electronic device 310 may send signals to the mobile devices 320a-320d to facilitate communication sessions. In various embodiments, the signals can be a low power signal (e.g., Bluetooth Low Energy (BLE). The signals can be used by the mobile devices to determine one or more time windows for communication of information. The mobile device 310 can transmit a communication packet that can be received by one or more of the multiple mobile devices 320a, 320b, 320c, and 320d.

The electronic device 310 can transmit a ranging message at a predetermined frequency. For example, the electronic device 310 can transmit messages at a 10 cycles per second. The message can include one or more response slots (discussed in more detail below) that can be selected by the mobile devices 320a, 320b, 320c, and 320d. The response slot that is selected by the mobile devices 320a, 320b, 320c, and 320d can be chosen randomly or pseudo-randomly. The frequency of responding to the ranging messages from the electronic device 310 can be based on a number of factors. The factors can include a state of the mobile device (e.g., awake or asleep), mobile device orientation (e.g., face down), application state (e.g., music App active), motion of the mobile device (e.g., at rest for period of time), and a relative position (distance/angle) between the mobile device and the speaker.

The electronic device 310 can calculate a range to the mobile devices based on the time of reception of the response message. The response message can include an identifier for the mobile devices 320a, 320b, 320c, and 320d. The calculated ranges can be transmitted to the one or mobile devices 320a, 320b, 320c, and 320d over UWB or a different protocol. The mobile devices 320a, 320b, 320c, and 320d can use the received range to execute one or more actions (e.g., display a user interface or execute a hand-off).

Alternatively, a mobile device can itself determine a range value using timings of a transmitted message and a received message. For example, the mobile devices 320a, 320b, 320c, and 320d can also transmit a request message. The electronic device 310 can respond to the request messages from the mobile devices. The mobile devices 320a, 320b, 320c, and 320d can use the time of transmission and the time of arrival to calculate a range to the electronic device 310. The mobile device 320a, 320b, 320c, and 320d can use the calculated range to execute one or more actions (e.g., display a user interface or execute a hand-off).

The communications between the devices can be implemented using frames. A frame can refer to a digital data transmission unit in computer networking and telecommunication. A frame typically includes one or more frame synchronization features comprising a sequence of bits or symbols that indicate to the receiver the beginning and end of the payload data within the stream of symbols or bits it receives.

A. Low Energy Protocols

A passive beacon can transmit a timing signal via a wireless protocol (e.g., Bluetooth Low Energy (BLE) advertising). One of the advantages of BLE is lower power consumption even when compared to other low power technologies. BLE achieves the optimized and low power consumption by keeping the radio off as much as possible and sending small amounts of data at low transfer speeds. Another advantage of BLE is that it is enabled in most smartphones in the market.

In the advertising state, a device sends out packets containing useful data for others to receive and process. The packets are sent at an interval defined as the Advertising Interval. The interval can be random or pseudo-random. There are 40 radio frequency channels in BLE, each separated by 2 MHz (center-to-center). Three of these channels are called the Primary Advertising Channels, while the remaining 37 channels are used for Secondary Advertisements and for data packet transfer during a connection. Advertisements can start with advertisement packets sent on the three Primary Advertising Channels (or a subset of these channels). This allows centrals to find the Advertising device (Peripheral or Broadcaster) and parse its advertising packets. The central can then initiate a connection if the advertiser allows it (e.g., peripheral devices).

B. Ultra-Wideband Packet Transmissions

Ultra-Wide Band (UWB) transmissions are not continuous transmissions, so a receiving device looking to acquire the UWB transmission would either need knowledge of the start time of the transmission or would need to expend energy in a powered-on state listening until the device captures the impulse UWB signal. If the receiving device knows even an approximate time of transmission, the receiver can remain in a reduced-power or sleep mode until just prior to the transmission time. For UWB communications, it can be challenging the receiving device to know when the first packet is going to arrive.

A technique to propagate the UWB transmission times is to broadcast the transmission time information at a defined time after an advertisement signal using another wireless protocol, e.g., Bluetooth Low Energy (BLE) advertisement transmissions. Although examples may refer to Bluetooth, other wireless protocols may be used. BLE has 40 physical channels in the 2.4 GHz ISM band, each separated by 2 megahertz (MHz). Bluetooth defines two transmissions types: data and advertising transmissions. As such, three of these 40 channels are dedicated to advertising and 37 dedicated to data. Advertising allows devices to broadcast information defining their intentions.

The UWB information packets can be structured to transmit at a specific time relative to the transmitting device's BLE advertisements. Accordingly, the receiving device can listen for the UWB packets at an expected time or during an expected time window around the expected time. The UWB packets can convey transmitting device information, deep links, and/or transmission time information. The receiver device can use the time in the BLE advertising message to determine when to listen for the next poll. The UWB packets can be transmitted in the UWB frequency range.

The wireless protocol used for ranging can have a narrower pulse (e.g., a narrower full width at half maximum (FWHM)) than a first wireless protocol (e.g., Bluetooth) used for initial authentication or communication of ranging settings. In some implementations, the ranging wireless protocol (e.g., UWB) can provide distance accuracy of 5 cm or better. In various embodiments, the frequency range can be between 3.1 to 10.6 Gigahertz (GHz). Multiple channels can be used, e.g., one channel at 6.5 GHz another channel at 8 GHz. Thus, in some instances, the ranging wireless protocol does not overlap with the frequency range of the first wireless protocol (e.g., 2.4 to 2.485 GHz).

The ranging wireless protocol can be specified by IEEE 802.15.4, which is a type of UWB. Each pulse in a pulse-based UWB system can occupy the entire UWB bandwidth (e.g., 500 MHz), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

Each one of ranging messages (also referred to as frames or packets) can include a sequence of pulses, which can represent information that is modulated. Each data symbol in a frame can be a sequence. The packets can have a preamble that includes header information, e.g., of a physical layer and a media access control (MAC) layer, and may include a destination address. In some implementations, a packet frame can include a synchronization part and a start frame delimiter, which can line up timing.

A packet can include how security is configured and include encrypted information, e.g., an identifier of which antenna sent the packet. The encrypted information can be used for further authentication. However, for a ranging operation, the content of the data may not need to be determined. In some embodiments, a timestamp for a pulse of a particular piece of data can be used to track a difference between transmission and reception. Content (e.g., decrypted content) can be used to match pulses so that the correct differences in times can be computed. In some implementations, the encrypted information can include an indicator that authenticates which stage the message corresponds, e.g., ranging requests can correspond to stage 1 and ranging responses can correspond to stage 2. Such use of an indicator may be helpful when more than two devices are performing ranging operations in near each other.

The narrow pulses (e.g., ~one nanosecond width) can be used to accurately determine a distance. The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging waveform of plus 1's and minus 1's in some pattern that is recognized by a receiver. The distance measurement can use a round trip time measurement, also referred to as a time-of-flight measurement. As described above, the mobile device can send a set of timestamps, which can remove a necessity of clock synchronization between the two devices.

Mobile devices may use Global Navigation Satellite Systems (GNSS) (e.g., Global Positioning System (GPS)) or other location circuitry to determine the location of the mobile device. For example, a map application can show an approximate location of the mobile device on a map. However, such techniques for determining location are typically determined relative to some external reference frame that is fixed, and not to a variable reference frame, e.g., another mobile device. Additionally, GNSS systems can be limited indoors or in areas of blocked signals (e.g., dense urban environments) or suffer from inaccuracies from reflected signals. Further the standard accuracy for GPS systems is currently 4 meters for horizontal accuracy and worse for vertical accuracy. Enhanced communication techniques can allow for information exchanges that allow for angular determination, ranging, and information exchanges between electronic devices.

Figure 4:
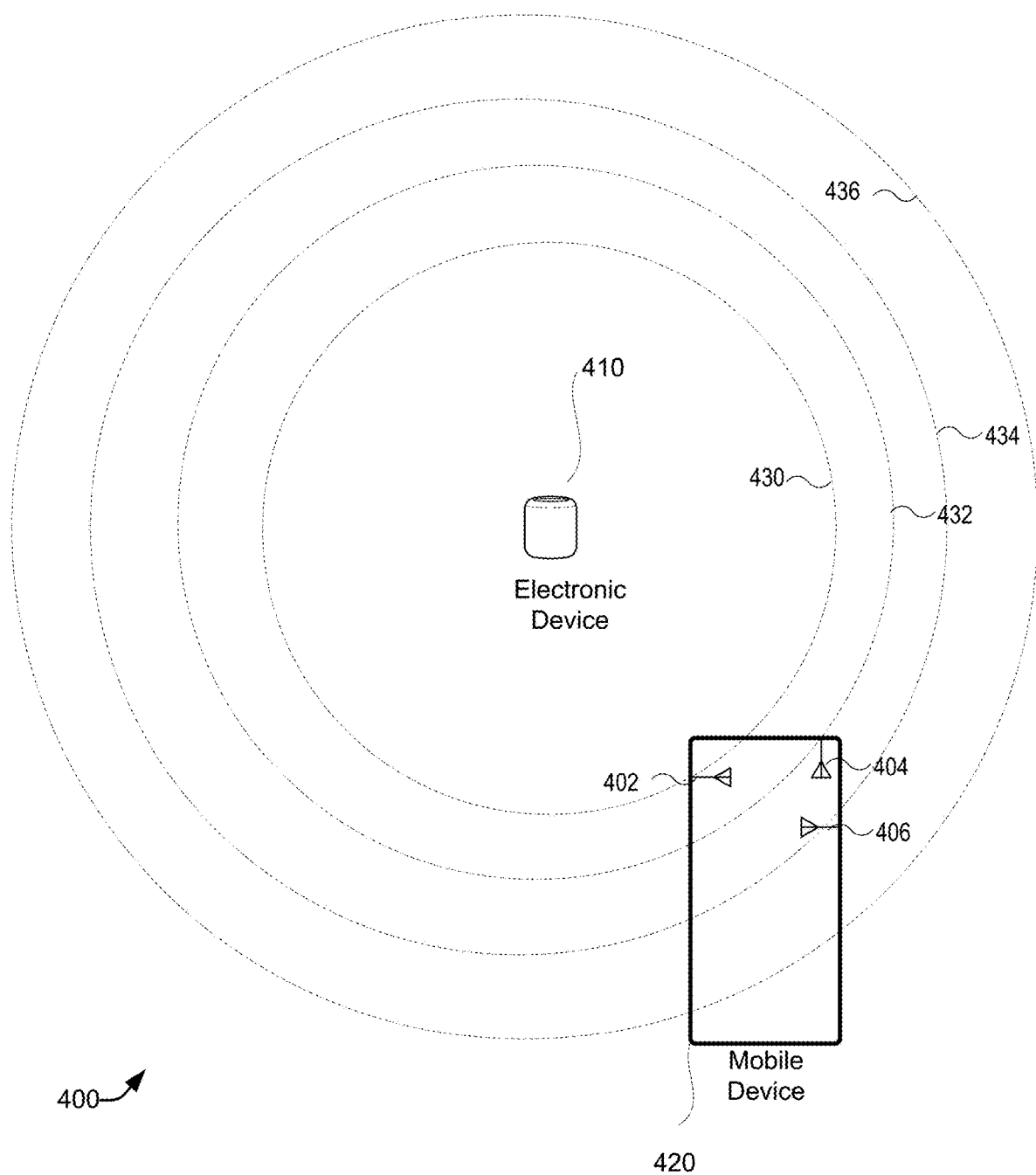
FIG. 4 illustrates a communication group involving an electronic device (e.g., a smart speaker, a smart TV, a smart appliance, etc.) and a mobile device with a multiple-antenna array.

FIG. 4 illustrates a communication group 400 involving an electronic device 410 (e.g., a smart speaker, a smart TV, a smart appliance, etc.) and a mobile device 420. The mobile device 420 can include a plurality of antennas in different orientations mounted on the mobile device 420. For example, a first antenna 402, a second antenna 404, a third antenna 406 can be installed on the mobile device 420. The antenna configuration shown in FIG. 4 is merely exemplary and other antenna array configurations with various number, location and orientations of antennas can be employed.

The mobile device 410 can transmit messages that travel in an omnidirectional manner. FIG. 4 illustrates the position of the transmission packet at various points in time. At a first time $t_1$ the transmission packet is a first range 430 from the transmitting device 410. At a second time $t_2$ the transmission packet is a second range 432 from the transmitting device 410. At a third time $t_3$ the transmission packet is a third range 434 from the transmitting device 410. At a fourth time $t_4$ the transmission packet is a fourth range 436 from the transmitting device 410.

The transmission packet can be received by the different antennas 402, 404, 406 of the mobile device 420 at different times ($t_1$, $t_2$, $t_3$). Based on the depicted orientation, the first antenna 402 would receive the transmission packet first at time $t_1$, followed by the second antenna 404 at time $t_2$, and finally the third antenna 406 at time $t_3$. The receiving device 420 can use the different reception times at the different antennas to calculate an angle of arrival from the receiving device 420 to the electronic device 410.

Figure 5:
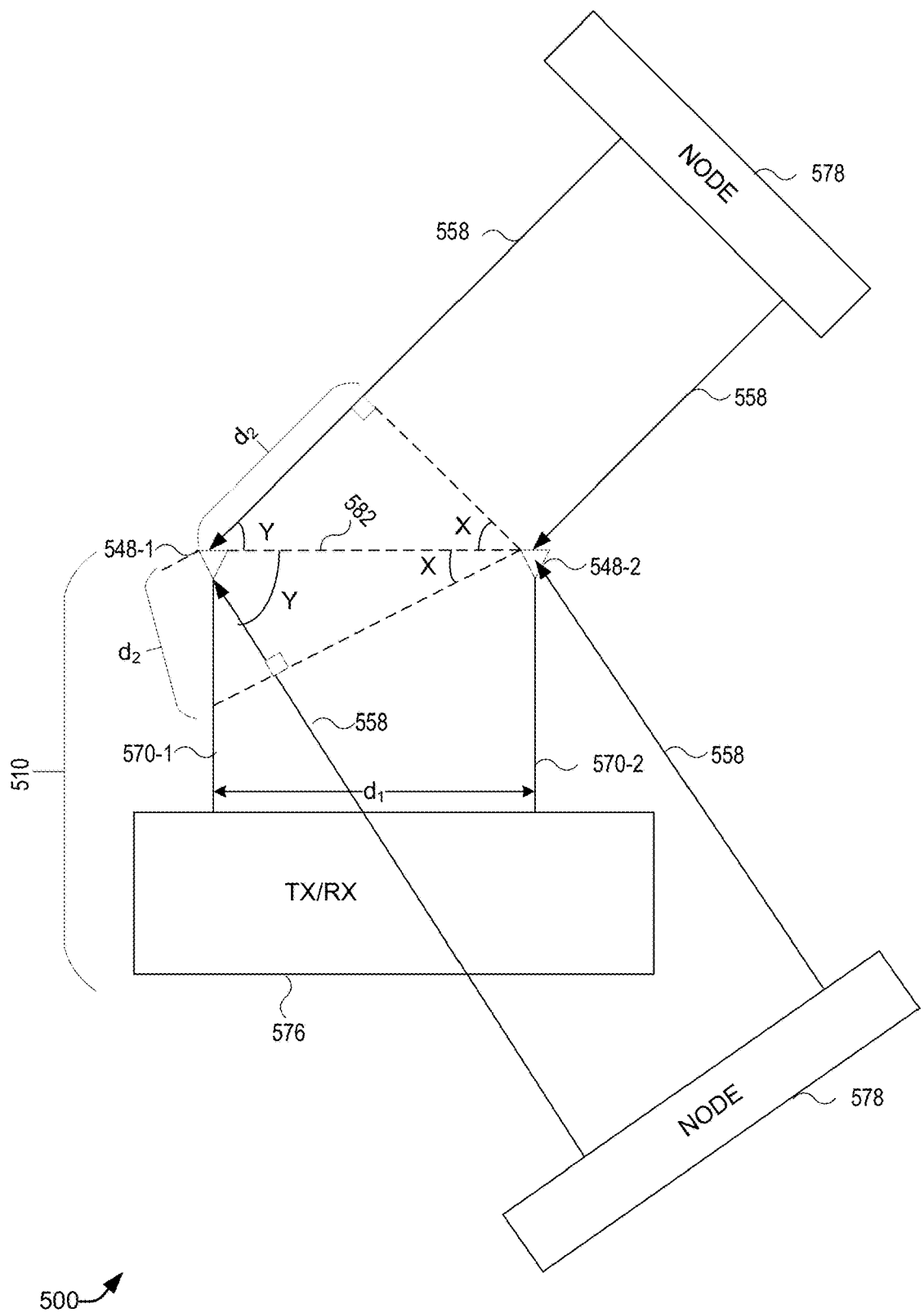
FIG. 5 illustrates a communication technique for determining an angle of arrival.

FIG. 5 is a schematic diagram 500 showing how angle of arrival measurement techniques may be used to determine the orientation of device 510 relative to nodes 578. The angle of arrival information can be used to trigger one or more features for the electronic device. For example, a user interface can be generated for controlling the electronic device if the mobile device is pointed at the electronic device. The term "node" may be used to refer to an electronic device, an object without electronics, and/or a particular location. In some arrangements, nodes may be associated with a mapped environment (e.g., the term node may refer to a device, object, or location in a mapped environment). Devices 510 may have control circuitry that determines where other nodes are located relative to device 510. The control circuitry in device 510 may synthesize information from cameras, motion sensors, wireless circuitry such as antennas, and other input-output circuitry to determine how far a node is relative to device 510 and/or to determine the orientation of device 510 relative to that node. The control circuitry may use output components in device 510 to provide output (e.g., display output, audio output, haptic output, or other suitable output) to a user of device 510 based on the position of the node. The control circuitry may, for example, use antenna signals and motion data to determine the angle of arrival of signals from other electronic devices to thereby determine the locations of those electronic devices relative to the user's electronic device.

As shown in FIG. 5, electronic device 510 may include multiple antennas (e.g., a first antenna 548-1 and a second antenna 548-2) coupled to transceiver circuitry 576 by respective transmission lines 570 (e.g., a first transmission line 570-1 and a second transmission line 570-2). Antennas 548-1 and 548-2 may each receive a wireless signal 558 from node 578. Antennas 548-1 and 548-2 may be laterally separated by a distance $d_1$, where antenna 548-1 is farther away from node 578 than 548-2 (in the example of FIG. 5). Therefore, wireless communications signal 558 travels a greater distance to reach antenna 548-1 than 548-2. The additional distance between node 578 and antenna 548-1 is shown in FIG. 5 as distance dz. FIG. 5 also shows angles x and y (where x+y=90°).

Distance da may be determined as a function of angle γ or angle x (e.g., $d_2 = d_1 \sin(x)$ or $d_2 = d_1 \cos(y)$). Distance da may also be determined as a function of the phase difference between the signal received by antenna 548-1 and the signal received by antenna 548-2 (e.g., $d_2 = (\Delta\phi\lambda)/(2\pi)$, where $\Delta\phi$ is the phase difference between the signal received by antenna 548-1 and the signal received by antenna 548-2 and λ is the wavelength of the received signal 558). Electronic device 510 may have phase measurement circuitry coupled to each antenna to measure the phase of the received signals and identify a difference in the phases ($\Delta\phi$). The two equations for $d_2$ may be set equal to each other (e.g., $d_1 \sin(x) = (\Delta\phi\lambda)/(2\pi)$) and rearranged to solve for angle x (e.g., $x = \sin(x)-1(\Delta\phi\lambda)/(2\pi d_1)$) or may be rearranged to solve for angle γ. As such, the angle of arrival may be determined (e.g., by control circuitry) based on the known (predetermined) distance between antennas 548-1 and 548-2, the detected (measured) phase difference between the signal received by antenna 548-1 and the signal received by antenna 548-2, and the known wavelength or frequency of the received signals 558.

Distance $d_1$ may be selected to ease the calculation for phase difference between the signal received by antenna 548-1 and the signal received by antenna 548-2. For example, $d_1$ may be less than or equal to one-half of the wavelength (e.g., effective wavelength) of the received signal 558 (e.g., to avoid multiple phase difference solutions).

Some antenna arrangements may be sufficient for resolving the "complete" angle of arrival of signals 558 without ambiguity. A complete angle of arrival (sometimes referred to as the direction of arrival) includes an azimuth angle θ and an elevation angle γ of node 578 relative to device 5.

Antennas that are located in a three-dimensional arrangement (e.g., spanning multiple planes) may be sufficient to determine the complete angle of arrival of signals 558 without ambiguity. However, when the baseline vectors (i.e., the vectors that extend between respective pairs of antennas) are all located in one plane, there may be some ambiguity as to the correct azimuth angle θ and/or the correct elevation angle γ of signals 558. In the two-antenna arrangement of FIG. 5, for example, there is only one baseline vector 582, which yields an accurate, unambiguous azimuth angle θ, but may not provide sufficient information to determine elevation angle φ. Thus, node 578' with a different elevation angle may nonetheless produce signals 558' with the same phase difference $\Delta\phi$ between the signal received by antenna 548-1 and the signal received by antenna 548-2 as signals 558. In other words, different directions of arrival may result in the same phase difference. This leads to an ambiguity in the angle of arrival solution. Without other information, control circuitry may be able to determine the azimuth angle θ of signals 558, but may be unable to determine elevation angle γ of signals 558. Systems with three or more coplanar antennas will resolve some but not all ambiguities in the angle of arrival because the baseline vectors will still be located in the same plane.

To help resolve ambiguities in the complete angle of arrival, control circuitry may combine antenna signals with motion data gathered using motion sensor circuitry. In particular, control circuitry may obtain angle of arrival measurements (e.g., measurements of azimuth angle θ and/or elevation angle φ) while device 510 is in multiple different positions. At each position, antennas 548 may receive signals 558 from node 578 and control circuitry may determine the possible angle of arrival solutions based on the phase difference between signals received by antenna 548-1 and signals received by antenna 548-2. Motion sensor circuitry may track the movement of device 510 as it is moved from one position to another. Using the motion data from motion sensor circuitry, control circuitry may associate each set of angle of arrival solutions with a different baseline vector 582. The baseline vectors may span multiple planes, thus providing sufficient information for control circuitry to determine the correct angle of arrival, just as if device 510 had a multi-planar antenna arrangement.

It should be understood that using a horizontal coordinate system and representing the complete angle of arrival with azimuth and elevation angles is merely illustrative. If desired, a Cartesian coordinate system may be used and the angle of arrival may be expressed using a unit direction vector that is represented using x, y, and z coordinates. Other coordinate systems may also be used. A horizontal coordinate system is sometimes described herein as an illustrative example.

III. Smart Speaker Communication Techniques

An electronic device (e.g., a smart speaker, a smart TV, a smart appliance, etc.) can interact with one or more mobile devices. The mobile devices can provide a source of audio content for the smart speaker. In addition the mobile device can execute a phone call that can be handed-off to the smart speaker. A user can control the electronic device via a user interface on the mobile device. The user device can provide audio controls such as volume, fast forward, reverse, pause, stop, next track etc. The user interface also allows for selecting a specific track to play on the mobile device. The smart speaker can also include ranging capabilities such as those provided by UWB. The ranging capabilities allow for determining one or more distances between the smart speaker and one or more mobile devices. The range information can be used for a more efficient hand-off procedure. The range information can also be used to trigger other interactions with the mobile devices. In addition, the range information can be used by the electronic device that can be used as a hub for a home automation system. The hub can control one or more smart devices (e.g., smart lights, smart outlets, video cameras).

A. Single Smart Speaker

Figure 6:
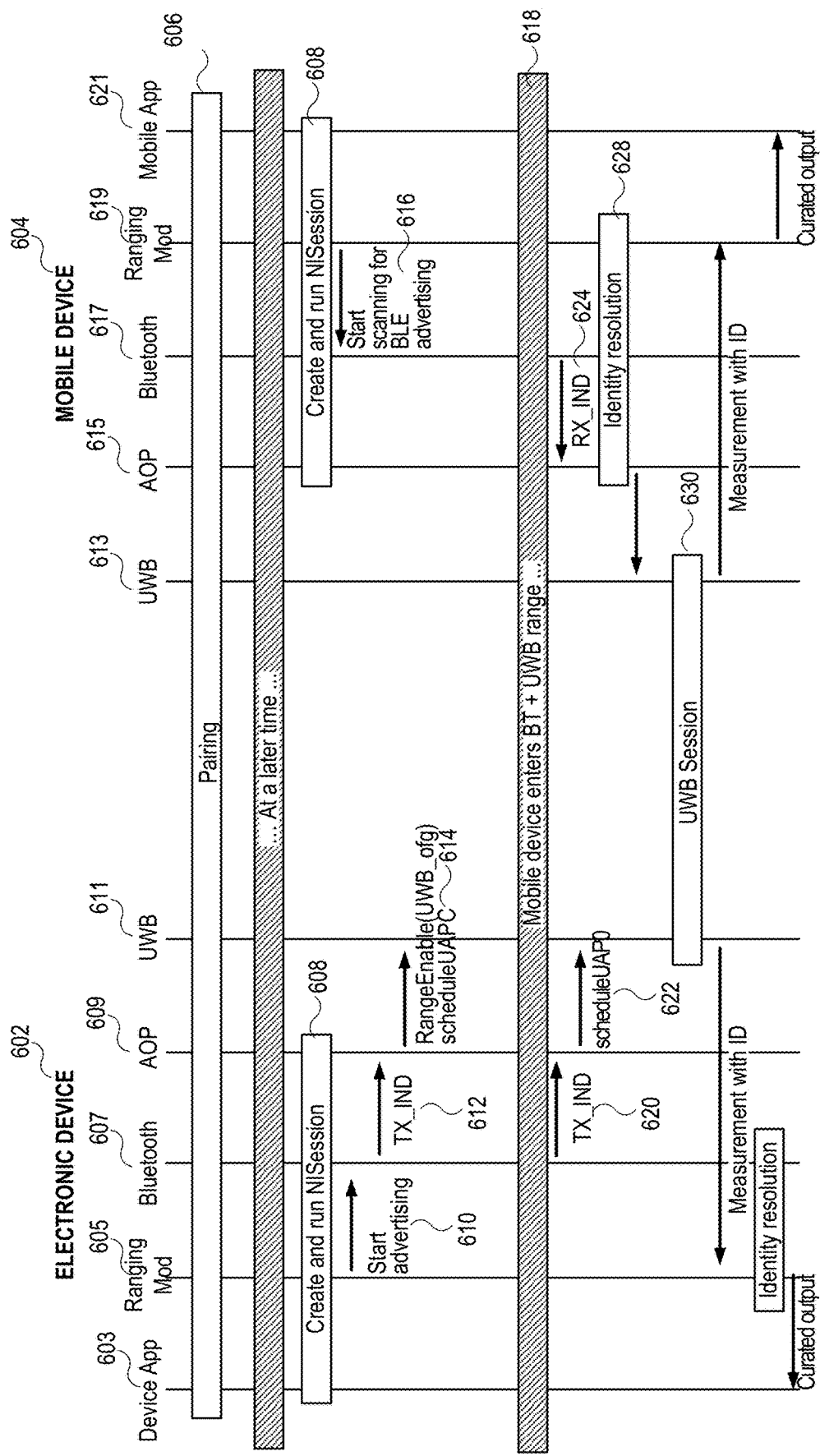
FIG. 6 illustrates an exemplary use of ranging techniques by a smart speaker device with a mobile device.

FIG. 6 illustrates an exemplary use of ranging techniques by an electronic device 602 (e.g., a smart speaker, a smart TV, a smart appliance, etc.) with a mobile device 604. In various embodiments, the electronic device can first pair, at 606, with the mobile device 604. Bluetooth pairing occurs when two enabled devices agree to establish a connection and communicate with each other, share files and information. In order to pair two Bluetooth wireless devices, a password called a "passkey" can be exchanged between both devices. The passkey serves as authorization to share information and files between both devices and users. The electronic device 602 can include one or more devices Apps 603, a ranging module 605, a Bluetooth transceiver 607, an Always on Processor (AOP) 609, and at least one UWB module 611. The mobile device 604 can include a UWB module 613, a mobile device AOP 615, a Bluetooth transceiver 617, a ranging module 619 and one or more mobile Apps 621.

To connect with a peer device, an App 603 first creates a NISession 608. A NISession 608 is programming code that identifies a unique connection between two devices. Here, the connection is between the electronic device 602 and the mobile device 604. Because one NISession 608 identifies an interaction between two peers, the App can establish a separate session object for each peer it interacts with simultaneously.

The ranging module 605 can include a framework that can stream distance and direction between certain devices having ranging capabilities (e.g., a UWB chipset). The ranging module 605 can include an application-programming interface to determine the relative position of two or more devices.

The ranging module 605 can initiate the ranging session by sending, at 610, a command to the Bluetooth to begin advertising. At 612, the Bluetooth transceiver 607 can begin transmitting an advertising signal. A technique to propagate the UWB transmission times is to broadcast the transmission time information at a defined time after an advertisement signal using another wireless protocol, e.g., Bluetooth Low Energy (BLE) advertisement transmissions. Although examples may refer to Bluetooth, other wireless protocols may be used.

At 614, the electronic device AOP 609 can enable UWB ranging and schedule the UWB Acquisition Packet (UAP) transmissions. The UAP contains the UWB transmission time. The UAP transmission time can be structured to occur at a specific time relative to the transmitting device's BLE advertisements. Accordingly, the receiving device can listen for the UAPs at an expected time or during an expected time window around the expected time. UAPs will be discussed further below in connection with FIG. 10.

At 616, mobile device ranging module 619 of the receiving mobile device 604, can send a command to the Bluetooth transceiver 617 to start scanning for the BLE advertising signal. The mobile device 604 will look to receive the UAPs a set time after the BLE advertising signal transmission.

At 618, the mobile device 604 enters the Bluetooth and UWB range of the electronic device 602. BLE range can be about 328 feet (or 100 meters). UWB range is about 30 feet (9.1 meters). Normally this is due to movement of the mobile device 604 relative to the electronic device 602.

At 620, the Bluetooth transceiver 607 can continue to transmit advertising signals. At 622, the electronic device AOP 609 can schedule the UAPs. At 624, the Bluetooth antenna of the mobile device 604 can receive the Bluetooth advertising signal. The logic of the mobile device 604 AOP 609 can listen for the UAP transmissions a set time after the Bluetooth advertising signal is received. At 628, the mobile device 604 can identify the electronic device 602 transmitting the UAP. At 630, a UWB ranging session can occur between the electronic device 602 and the mobile device 604. The UWB session 630 can provide each device with a range measurement and an identifier for the other device (e.g., the identifier for the mobile device 604). The ranging session can include multiple packet exchanges between the electronic device 602 and the mobile device 604. The range measurement can be conducted by the mobile device 604 or sent from the electronic device 602. This range information can be curated and provided to the device App 603 or the Mobile App 621.

B. Distance-Based Ranging

Figure 7B:
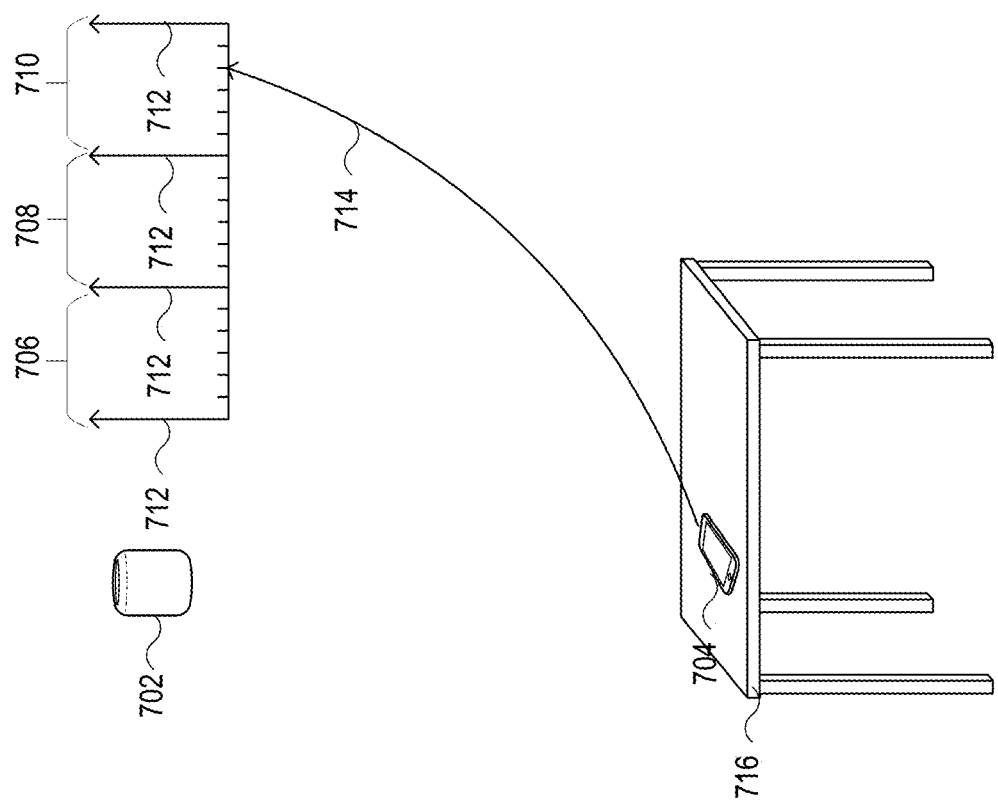
FIG. 7B illustrated an electronic device conducting ranging with a mobile device at a second rate.
Figure 7A:
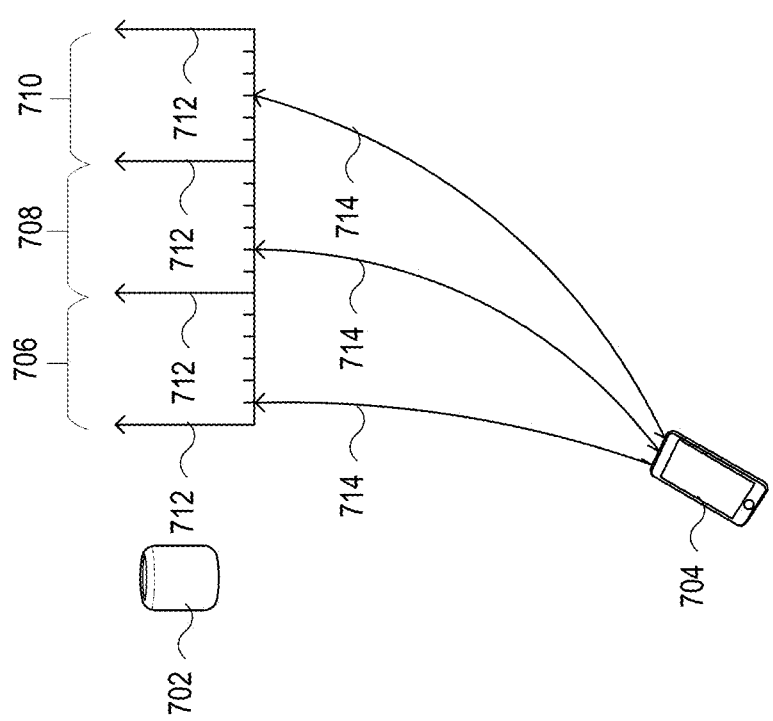
FIG. 7A illustrates an electronic device conducting ranging with a mobile device at a first rate.

FIG. 7A illustrated an electronic device 702 conducting ranging with a mobile device 704. As a mobile device enters a room, the mobile device can scan on Bluetooth or on UWB or both. The mobile device can receive a signal informing it that there is an electronic device (e.g., a smart speaker, a smart TV, a smart appliance, etc.) that the mobile device can interact with spatially. The mobile device can choose whether or not to interact with the electronic device, e.g., by receiving a UWB packet and sending a UWB packet and repeat that a certain number of times.

The electronic device 702 and the mobile device 704 are both able to calculate the range value between the devices. In some cases, the electronic device 702 and/or the mobile device 704 can calculate an angle of arrival of the transmitted signal.

The electronic device 702 transmits a ranging request 712. The ranging request 712 can include information that identifies one or more response slots following the transmission of the ranging request 712. The electronic device can transmit ranging pulses at a consistent rate. The timing between each of the pulses is a known value for consistent pulses. The time between the ranging pulses can be known as a response slot. As shown in FIGS. 7A and 7B, there is a first response slot 706, a second response slot 708, and a third response slot 710 following each of a first, second, and third ranging request 712.

In FIG. 7A, the mobile device 704 can exhibit one or more conditions that would cause the mobile device 704 to respond more frequently to the ranging request 712 messages. For example, the mobile device 704 may be within a certain predefined range from the electronic device, the mobile device 704 motion may exceed a certain threshold, a particular application on the mobile device 704 may be active, and the mobile device 704 may be oriented toward the electronic device 702 or any combination of the above. For example a mobile device that is stationary, with the screen lock active, even if it is within a range for higher response rate can chose to remain at a lower response rate due to these other factors. As shown in FIG. 7A, the mobile device 704 transmits a response message 714 during each of the first 706, second 708, and third 710 response slots.

According to various embodiments, as the mobile device 704 gets closer to the electronic device 702, visual and haptic cues can be generated on the mobile device 704. For example, as the mobile device 704 approaches a threshold distance to the electronic device 702 a user interface can be generated on the mobile device 704 advising the user that hand-off will occur. As the mobile device 704 crosses the threshold, the hand-off is executed.

In some embodiments, as the smart speaker starts to fade up to music an equalization filter is applied to help the smart speaker to sound tinny like a phone speaker and as the smart speaker completes the hand off once the mobile device moves into a really close proximity. In that way the smart speaker can gradually fill the room with the smart speaker sound.

FIG. 7B illustrates a similar configuration of the electronic device 702 and the mobile device 704. However, the mobile device 704 may be exhibit one or more conditions that would cause the mobile device 704 to respond to less frequently to the ranging request 712 messages. For example, the mobile device 704 may be inactive sitting on a table 716. The mobile device 704 may also be outside a specified range from the electronic device. The music App may also be inactive on the mobile device 704. Under these circumstances the mobile device 704 may preserve battery life and respond less frequently. In this case the mobile device 704, ignored the first two ranging 712 messages and responded only after the third ranging 712 message.

Figure 8:
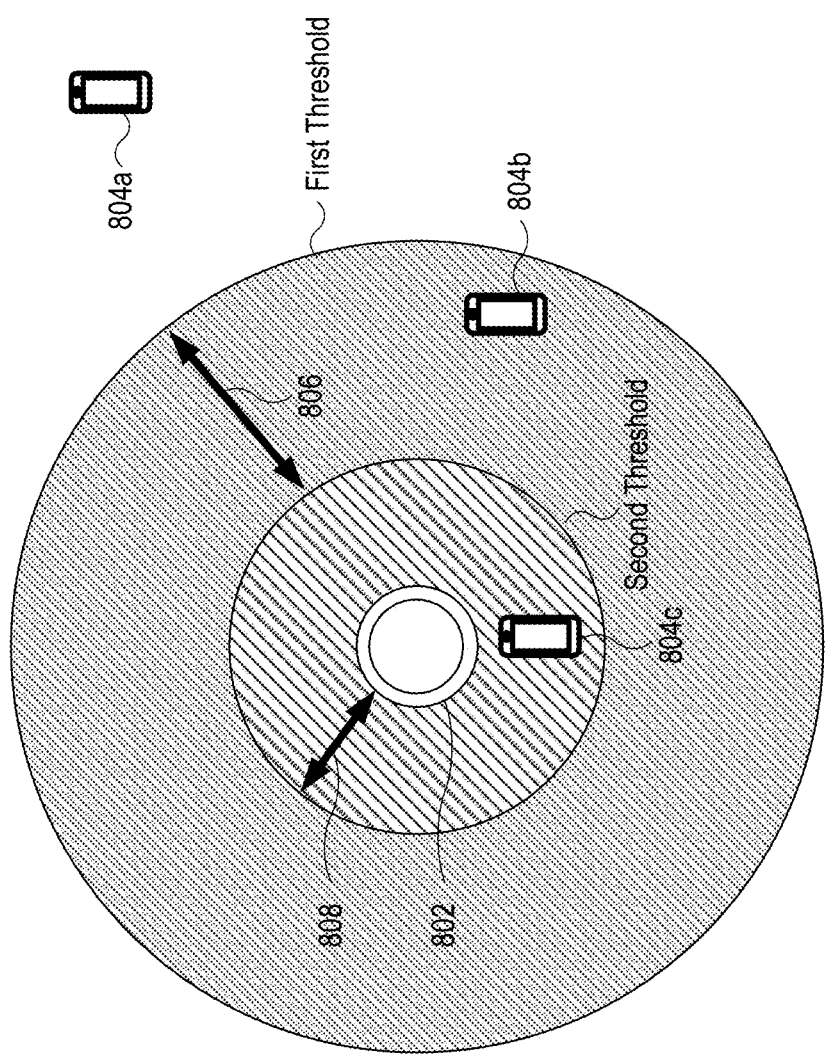
FIG. 8 illustrates an electronic device communicating with multiple mobile devices.

FIG. 8 illustrates an electronic device 802 communicating with multiple mobile devices 804a, 804b, and 804c. A first mobile device 804a is shown outside a first range 806 from the electronic device 802. In various embodiments, the first range 806 can be 3.5 meters. Outside the first range 806, the first mobile device 804a can conduct intermittent ranging if the phone is awake and the phone is playing music. In various embodiments, the continuous ranging can be 0.5 Hz ranging.

A second mobile device 804b is shown inside the first range 806 but outside a second range 808. In various embodiments, the second range can be 0.5 meters. Mobile devices between the first range 806 and the second range 808 can respond to ranging requests at a higher rate (e.g., 2 Hz) than mobile devices outside the first range 806. In some implementations, the range between a first range 806 and the second range 808 can correspond to a range a person can carry a mobile device in 2 seconds.

Inside a second range 808, the third mobile device 804c can respond to the ranging requests from the electronic device 802 at a consistent rate. In various embodiments, the continuous rate is can be 10 Hz. The higher continuous rate inside the second range 808 allows for rapid LED and haptic responses.

C. Multiple Smart Speakers

Figure 9:
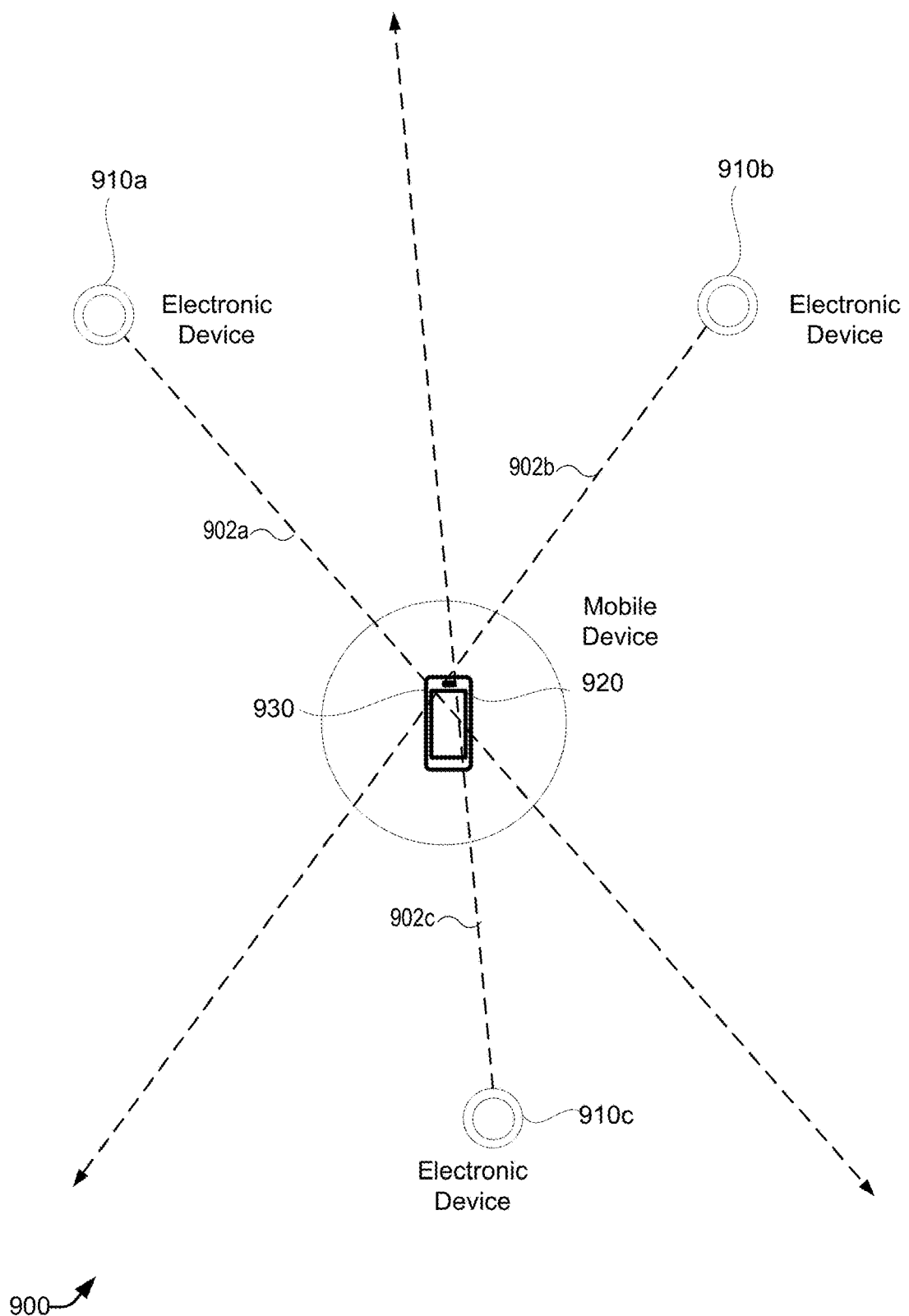
FIG. 9 illustrates a passive beacon communication group involving multiple transmitting devices (e.g., a smart speaker, a smart TV, a smart appliance, etc.) and a mobile device.

FIG. 9 illustrates an electronic device group 900 (e.g., multiple smart speakers) involving multiple transmitting devices 910a, 910b, and 910c (e.g., a smart speaker, a smart TV, a smart appliance, etc.) and a mobile device 920. For example, multiple electronic devices can often be used together for stereo features for home theaters. Although three transmitting devices 910a, 910b, and 910c are illustrated in FIG. 9, other combinations, configurations, and arrangements can be considered. For various embodiments for passive calculation of location, two transmitting devices can be used. Although one mobile device 920 is illustrated, multiple receiving devices can also be used. In various embodiments, the transmitting devices 910a, 910b, and 910c can be positioned throughout a given environment (e.g., an indoor layout of a home).

In certain circumstances, the mobile devices 920 may be ranging with more than one electronic device 920. Perhaps the mobile device 920 is between the first range 806 and the second range 808 for both electronic device 910a and electronic device 910b. This can result in potential collisions between the ranging packets and responses if both the mobile device 920 is responding at the same rate for ranging requests for each device. To avoid these collisions the mobile device 920 randomly selects a time within the slot to respond. Second the devices can select a random offset so if the mobile device is responding in a frame and skipping a bunch of slots and then responding in this frame another mobile device would randomly choose like this one and another one. So there is randomization in terms of what time slot and also what frame the mobile device 920 responds in.

Each of the multiple transmitting devices 910a, 910b, and 910c can generate and transmit ranging information packets. In various embodiments the information packets can be ranging packets. In various embodiments, the multiple transmitting devices 910a, 910b, and 910c are at a known geographic position or location (e.g., a known location in the home).

In various embodiments, the receiving device 920 can receive one or more information packet transmissions 902a, 902b, and 902c from the transmitting devices 910a, 910b, and 910c. The receiving device 920 can calculate an angle of arrival for each of the information packet transmissions 902a, 902b, and 902c (using techniques previously described).

In various embodiments, the angles of arrival to each of the transmitting devices can be used to calculate a probable location or an area of probability 930 for the location of the receiving device 920. In this way, the receiving device 920 can passively receive information from the transmitting devices 910a, 910b, and 910c to calculate a precise location of the receiving device 920 even if indoors or an areas without GNSS coverage.

IV. Ultra-Wide Band Acquisition Packets (UAPS)

UWB transmissions are not continuous transmissions, so a receiving device looking to acquire the UWB transmission would either need knowledge of the start time of the transmission or would need to expend energy in a powered-on state listening until the device captures the impulse UWB signal. If the receiving device knows even an approximate time of transmission, the receiver can remain in a reduced-power or sleep mode until just prior to the transmission time. For UWB communications, it can be challenging the receiving device to know when the first packet is going to arrive.

A technique to propagate the UWB transmission times is to broadcast the transmission time information at a defined time after an advertisement signal using another wireless protocol, e.g., Bluetooth Low Energy (BLE) advertisement transmissions. Although examples may refer to Bluetooth, other wireless protocols may be used. BLE has 40 physical channels in the 2.4 GHz ISM band, each separated by 2 megahertz (MHz). Bluetooth defines two transmissions types: data and advertising transmissions. As such, three of these 40 channels are dedicated to advertising and 37 dedicated to data. Advertising allows devices to broadcast information defining their intentions.

The packet containing the UWB transmission time (referred to as UWB Acquisition Packet (UAP)) can be structured to occur at a specific time relative to the transmitting device's BLE advertisements. Accordingly, the receiving device can listen for the UAPs at an expected time or during an expected time window around the expected time. The UAPs can convey the time of the next UWB poll transmission, which is part of a ranging measurement. For example, ranging requests can be considered poll transmissions. The receiver device can use the time in the UAP to determine when to listen for the next poll. The UAPs can also be transmitted in the UWB frequency range. The technique can also anchor the UAP transmission timing to any other long time sequence such as Apple Wireless Direct Link (AWDL) protocol currently used for Airdrop features.

Figure 10:
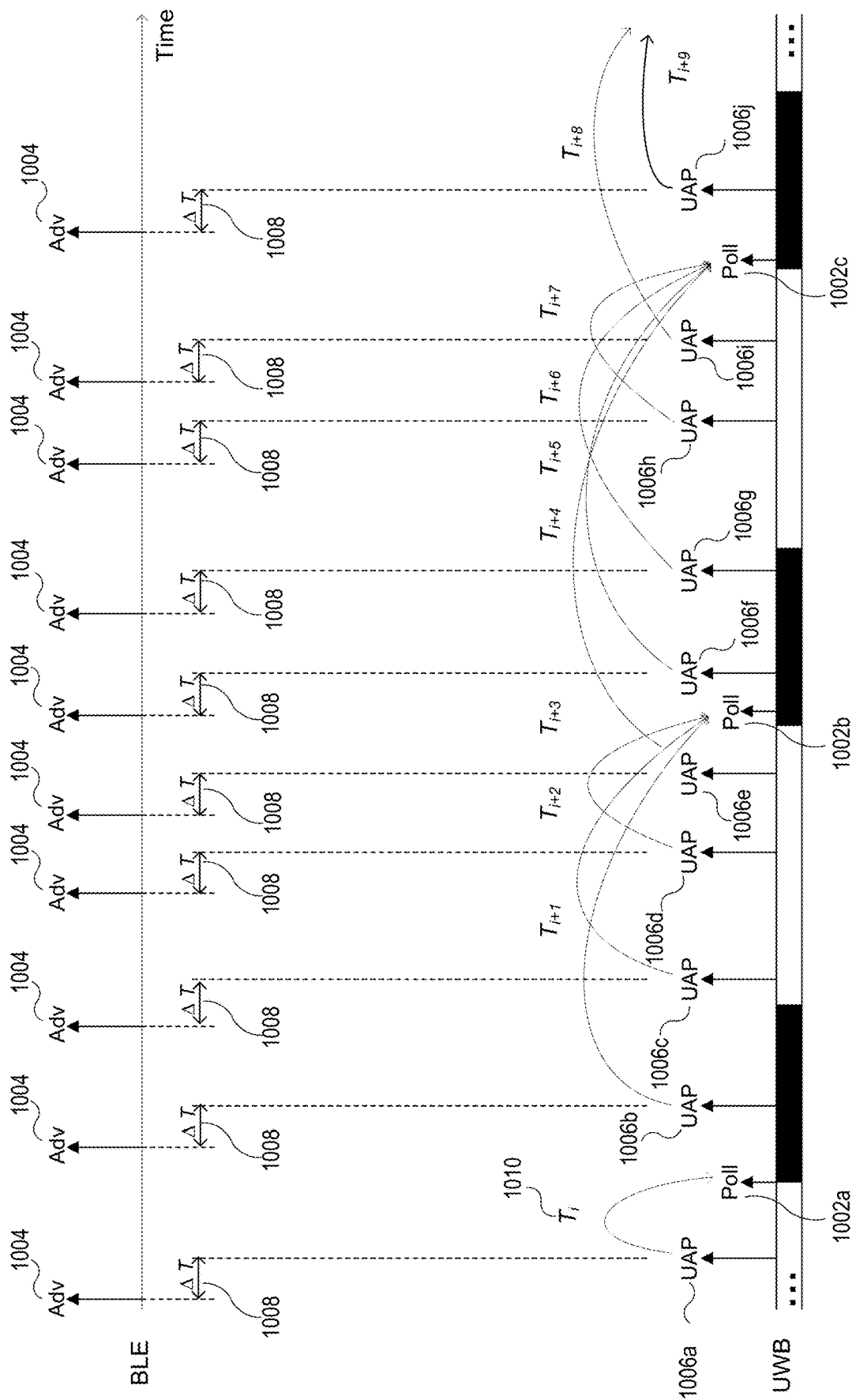
FIG. 10 illustrates an exemplary depiction of a timeline for using the advertisement signals to synchronize the timing for transmission of UWB Acquisition Packets (UAPs).

FIG. 10 illustrates an exemplary depiction of a timeline 1000 for using the BLE advertisement signals to synchronize the timing for transmission of UAPs. FIG. 10 illustrates a timeline 1000 for transmission of multiple signals (e.g., UWB signals and BLE signals) from a single device (e.g., a smart speaker, a smart TV, a smart appliance, etc.). An electronic device can transmit a UWB poll 1002 at regular intervals (e.g., every 100 milliseconds). The electronic device can also transmit BLE advertisements 1004 more frequently than the UWB poll 1002 transmissions. For example, the BLE advertisements 1004 can be transmitted approximately every 30 milliseconds. The BLE advertisements 1004 can be transmitted irregularly to avoid collisions between data packets. Thus, BLE advertisements 1004 can be transmitted at a predetermined interval (e.g., every 30 seconds) plus some random delay of 0 to 10 milliseconds. This provides random dithering between advertisements. The electronic device can transmit a UAP message 1006 at a fixed time interval (ΔT) 1008 following the transmission of the BLE advertisement 1004. The time interval (ΔT) 1008 can be predetermined so the receiving device (e.g., the mobile device) can know to listen for the UAP message 1006 after a predetermined time after transmission of the BLE advertisement 1004.

The electronic device can calculate the time duration between the transmission of the UAP message 1006 and the next UWB poll 1002. For example, as shown in FIG. 10, the time ($T_i$) is the time interval between the first UAP message 1006a and the first UWB poll 1002a. In some embodiments, the time interval can be around 200 microseconds. The UAP message 1006a can include the time ($T_i$) information. A receiving device that captures the UAP message 1006 can determine that the next UWB poll 1002b will occur at a time interval $T_i$ 1010 after receiving the UAP message 1006, thereby synchronizing the clocks between the electronic device and the receiving device.

FIG. 10 illustrates three UAP messages 1006b-d between the first UWB poll 1002a and the second UWB poll 1002b. Each of the UAP messages 1000b-d can include the time intervals (e.g., $T_{i+1}$, $T_{i+2}$, and $T_{i+3}$) until the second UWB poll 1002b. Each of the time intervals ($T_{i+1}$, $T_{i+2}$, and $T_{i+3}$) would be different because the time until the next UWB poll 1002b would decrease as time progresses. In some cases, such as for UAP message 1006e, there is not enough time remaining prior to the next UWB poll 1002b. In these cases, the UAP message 1006e provides the time to the subsequent UWB poll 1002c. This process can repeated as necessary.

The electronic device can conduct ranging with multiple mobile devices. The UWB poll 1002 can be the ranging request 201 as shown in FIG. 2 or the broadcast message 610 as shown in FIG. 6. For example in cases with one electronic device and three receiving devices in a ranging round, individual communications can be designated in certain time slots (as shown in FIG. 6), and the UAP messages 1006 can be transmitted during those timeslots. If a new receiver device wants to join the ranging session, the new receiver device can determine the timing schedule for the next UWB poll 1002b. In some embodiments, the single broadcast message for one-to-many can be the advertisement signal. The beacon device can transmit the UAP messages 1006 providing the time information to the next UWB poll 1002 (or the broadcast message) from the beacon. In this case, each receiving device that receives the UAP messages 1006 can use the information to determine when to listen for the UWB poll 1002. The UWB poll 1002 can provide information on the time slots for the ranging round. Each receiving device would then determine which timeslot the device is in and add an individual delay prior to responding.

In other embodiments, for each time slot there can be a different BLE advertisement signal 1004 and different UAP messages 1006 for that specific timeslot to synchronize the timing between the transmitting device and the receiving device in the timeslot.

V. Distance Based Ranging Techniques for an Electronic Device

Figure 11:
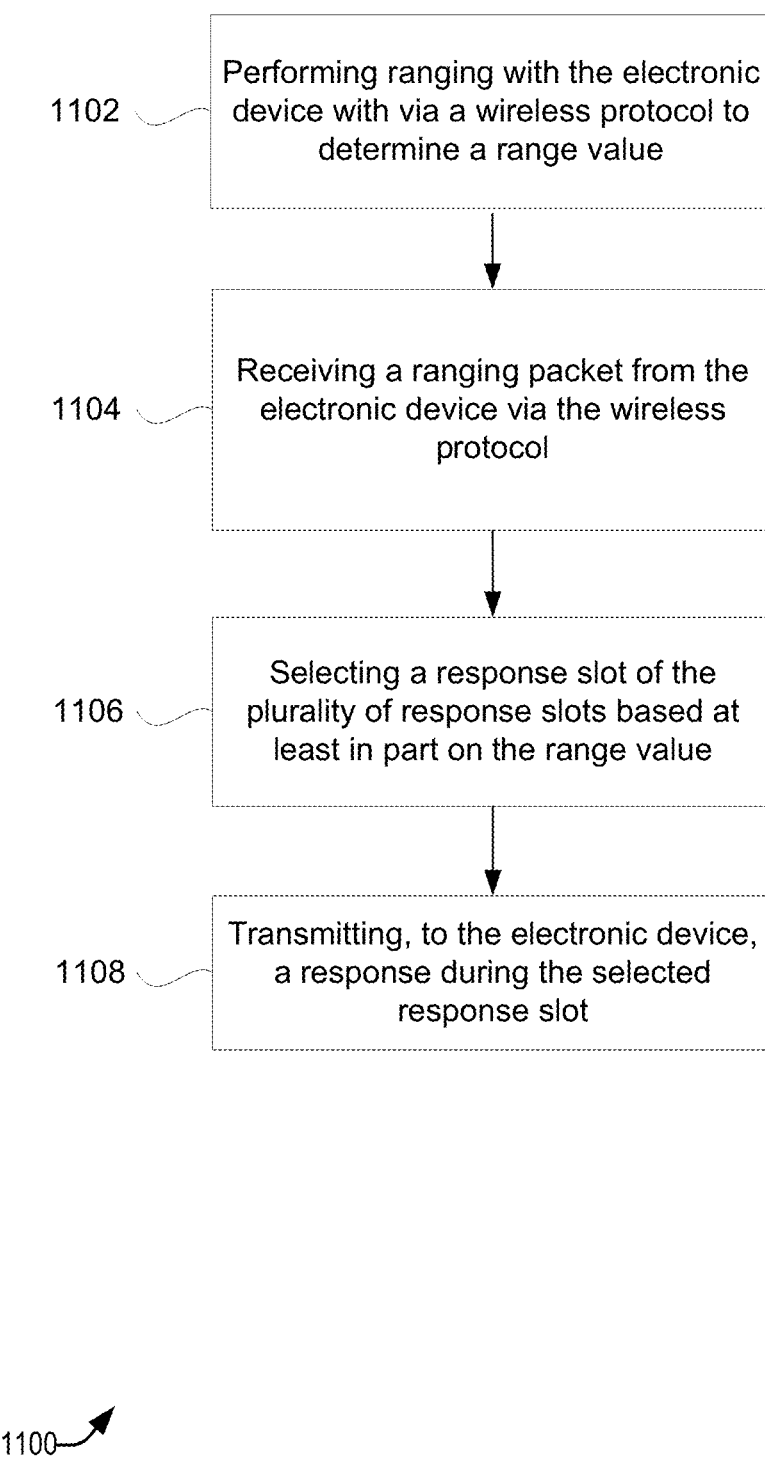
FIG. 11 illustrates an exemplary flowchart for a communication technique performed by one or more receiving devices.

FIG. 11 illustrates an exemplary flowchart for a communication techniques performed by one or more receiving device. Method 1100 can be used to determine a spatial relationship of other devices to the transmitting device (e.g., a smart speaker, a smart TV, a smart appliance, etc.). Method 1100 can be performed by any device that acts as a receiving device (e.g., a mobile device).

At 1102, the technique can include performing ranging with the electronic device with via a wireless protocol to determine a range value. The range value can specify a distance between the electronic device and the mobile device. In various embodiments, the electronic device can calculate the range value and transmit the range value to the mobile device. Alternatively, the mobile device can calculate the range value. The first wireless protocol can be an efficient, low-power protocol (e.g., Bluetooth Low Energy). Bluetooth Low Energy (BLE) is a low power wireless technology used for connecting devices with each other. BLE operates in the 2.4 GHz ISM (Industrial, Scientific, and Medical) band, and is targeted towards applications that need to consume less power and may need to run on batteries for longer periods of time—months, and even years. The information packets can include identification information for the transmitting device. In various embodiments, the advertising packet can specify a schedule for transmitting information packets.

In various embodiments, the ranging can include transmitting a ranging packet at a first time via a wireless protocol. The ranging can include receiving a response message from the transmitting device at a second time. The ranging can include calculating a range value between the mobile device and the electronic device based on a difference between the first time and the second time.

In various embodiments, the receiving device can use the advertising packets as a timing signal for synchronizing timing between the transmitting and receiving devices. The receiving device can use the time of the advertising packets to determine a listening window for receiving one or more ranging signals. The listening window can be a preselected time after reception of the advertising packets. The listening window can be based at least in part on a ranging schedule. In various embodiments, the schedule can be hardcoded in the one or more receiving devices. In various embodiments, the schedule can be hardcoded in the transmitting device.

In various embodiments, the ranging exchange can include the transmission and reception time stamps that can be used to calculate an initial range between the devices. In various embodiments, multiple packet exchanges can be used to calculate the initial range. Following the initial ranging exchange the process can include a poll message followed by a plurality of time slots for responses. Each response slot can include multiple packet exchanges. The poll messages can be transmitted at a defined rate (e.g., 10 Hz).

At 1104, the technique can include receiving a ranging packet from the transmitting device via the wireless protocol. In various embodiments the wireless protocol can be UWB. The ranging packet can define a plurality of response slots in accordance with a transmission rate of the electronic device. The ranging packet can be received by an antenna (e.g., a UWB antenna) of the mobile device. In various embodiments, the plurality of response slots can be defined by some other out-of-band communication. In addition, the first ranging packet can synchronize the rest of the frame. The frame can be comprised of the first "poll" ranging packet, followed by a plurality of response slots.

At 1106, the technique can include selecting a response slot of the plurality of response slots based at least in part on the calculated range value. The selected response slot can correspond to a first rate lower than the transmission rate of the electronic device. The first rate can correspond to a rate equal to the transmission rate. The lower transmission rate can preserve battery power of the mobile device. In various embodiments, the rate of response by the mobile device can depend on the range of the mobile device from the electronic device. Multiple range values can trigger different response rates. In various embodiments, a mobile device outside a first threshold can skip responding to several ranging request messages resulting in a low response rate thereby conserving battery power. In some embodiments the first threshold can be 3.5 meters. In some embodiments, the response rate can be ½ Hz.

In various embodiments, a mobile device inside a first threshold but outside a second threshold can skip responding to some ranging request messages, resulting in a moderate response rate thereby conserving battery power. In some embodiments, the second threshold can be 0.5 meters. In some embodiments, the response rate can be 2 Hz.

In various embodiments, a mobile device inside a second threshold can responding to the ranging request messages resulting in a fast response rate. In some embodiments, the response rate can be 10 Hz.

At 1108, the technique can include transmitting, to the electronic device, a response during the selected response slot. In various embodiments, the response message can include an identifier for the mobile device. The response message can include a calculated range by the mobile device. In various embodiments, the ranging response can be a single packet or a brief exchange or multiple packets.

In various embodiments, the selecting the response slot can include comparing the range value against one or more predetermined thresholds. The selecting the response slot can include selecting the response slot based on the range value being less than the one or more predetermined thresholds. In various embodiments, the mobile device can chose to respond only in some frames. In some frames, the mobile device may not respond in any time slot at all.

In various embodiments, the mobile device can consider one or more attributes of the mobile device to determine response rate. For example, the mobile device can consider the state of the mobile device, the state of an application of the mobile device, the motion of the mobile device, and an orientation of the mobile device. The mobile device can consider one or more of these factors in determining the response rate.

In various embodiments, the technique can include determining a state of the mobile device, wherein the state comprises one of awake or asleep. The technique can include selecting the response slot of the plurality of response slots based at least in part on the state of the mobile device, the selected response slot corresponding to a first rate lower than the transmission rate.

In various embodiments, the technique can include determining a state of an application of the mobile device, wherein the state comprises one of active or inactive. The technique can include selecting the response slot of the plurality of response slots based at least in part on the state of the application of the mobile device, the selected response slot corresponding to a first rate lower than the transmission rate.

In various embodiments, the technique can include determining a motion of the mobile device. The technique can include selecting the response slot of the plurality of response slots based at least in part on the motion of the mobile device being below a threshold, the selected response slot corresponding to a first rate lower than the transmission rate. In various embodiments, the technique can include selecting the response slot of the plurality of response slots based at least in part on the motion of the mobile device being above a threshold, the selected response slot corresponding to an increased transmission rate.

In various embodiments, the technique can include determining the range value has changed to be within a new threshold. The technique can include selecting an earlier response slot to increase a rate of ranging.

In various embodiments, the technique can include determining an orientation of the mobile device with respect to the electronic device. The technique can include selecting the response slot of the plurality of response slots based at least in part on the orientation of the mobile device pointing within a predetermined angular range, the selected response slot corresponding to a first rate lower than the transmission rate.

In various embodiments, the technique can include generating a user interface for the electronic device. The technique can include displaying the user interface based at least in part on the calculated range value.

In various embodiments the determining the angle of arrival can be accomplished by measuring the time difference of arrival (TDOA) between individual elements of the antenna array. TDOA measurement is made by measuring the difference in received phase at each element in the antenna array. TDOA of the ranging signal can be measured using the first reception time, the second reception time, and a known physical configuration of the plurality of antennas. The receiving device can use the known physical configuration of the plurality of antennas and the reception times for various antenna elements to determine an angle of arrival to the transmitting device. The angle of arrival can be expressed with respect to a surface and an orientation of the receiving device. For example, the angle of arrival can be 90 degrees from the top of a receiving device in portrait orientation. The internal phone gyroscopes can inform the receiving device whether it is in a profile or landscape (or some other) orientation.

In various embodiments, a phase difference on arrival may be used to calculate the angle of arrival. Estimating the AOA of a radio frequency signal by an antenna array relies on detecting the signal's phase when it arrives at multiple antenna elements. Due to the difference in propagation distances from the signal source to individual receive antennas, each antenna observes a different phase shift of the signal. For example, if the signal from a transmitter A are assumed to propagate in parallel through space, then the phase observed by the two receive antennas, $\Phi_{A1}$ and $\Phi_{A2}$, can be represented as a function of the angle of incidence $\theta$ and the distance separating the antennas $$d: \Phi_{A1} - \Phi_{A2} = \frac{2\pi d \sin\theta}{\lambda}$$

where $\lambda$ is the wavelength of the radio frequency signal. Therefore one only needs to know the phase difference in the antenna array to determine the incidence angle. Therefore, the angle of arrival $\theta$ is a function of the measured phase difference and antenna separation distance d. However, the above equation requires coherent phase detection by the antenna elements in order to compute the difference, meaning that the antenna elements need to be perfectly synchronized in both phase and clock rate. To ensure this, traditional antenna arrays usually are built on a single platform and with multiple antenna elements connecting to the same clock and oscillator.

In various embodiments, the technique can include comparing the angle of arrival to a threshold. In some embodiments, the receiving device can know the physical location of one or more transmitting devices at a given location. The calculated angle of arrival and be compared to one of more thresholds. The thresholds can be used to determine if the receiving device is oriented toward a transmitting device or within a predetermined threshold of the transmitting device. For example, if a transmitting device (e.g., a beacon) is attached to a city bus, the receiving device can determine if the receiving device is oriented toward the transmitting device or within a predetermined threshold (e.g., +/−10 degrees).

Based on the comparison of the angle of arrival to the threshold, the technique can include retrieving information specified by the transmitting device. The information can be specified by the advertising packet or the ranging signal. The information can include the identity of the beacon. The information can include a link or deep link to further information concerning the transmitting device. For example, the information can include a link to the bus schedule for the bus on which the transmitting device is attached. The information is specified by the advertising packet or the ranging signal.

In various embodiments, the technique can include determining a second angle of arrival from a second ranging signal from a second transmitting device. The technique can include determining a location of the mobile device by triangulating the ranging signal and the second ranging signal. In various embodiments, more than two transmitting devices can be available in the location.

It should be appreciated that the specific steps illustrated in FIG. 11 provide particular techniques for passive beacon communication techniques according to various embodiments of the present disclosure. Other sequences of steps may also be performed according to alternative embodiments. For example, alternative embodiments of the present disclosure may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

In various embodiments, the electronic device can include one or more memories; and one or more processors in communication with the one or more memories and configured to execute instructions stored in the one or more memories to performing operations of the technique described above.

In various embodiments, a computer-readable medium storing a plurality of instructions that, when executed by one or more processors of a computing device, cause the one or more processors to perform operations of any of the techniques described above.

Figure 12:
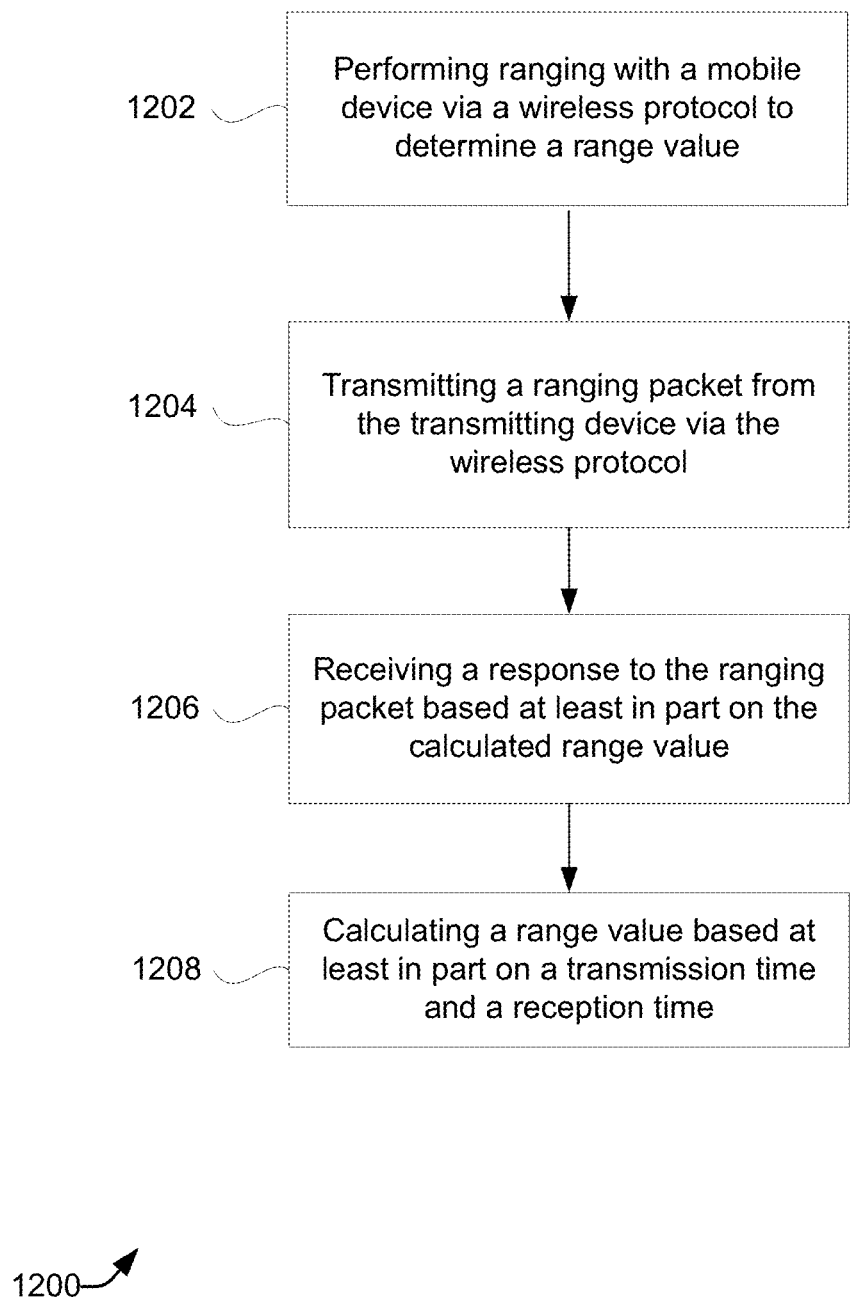
FIG. 12 illustrates an exemplary flowchart for a communication technique performed by an electronic device (e.g., a smart speaker, a smart TV, a smart appliance, etc.).

FIG. 12 illustrates an exemplary flowchart for a communication techniques performed by one or more receiving device. Method 1200 can be used to determine a spatial relationship of other devices to the transmitting device (e.g., a smart speaker, a smart TV, a smart appliance, etc.). Method 1200 can be performed by an electronic device (e.g., a smart speaker, a smart TV, a smart appliance, etc.).

At 1202, the technique can include performing ranging with a mobile device via a wireless protocol to determine a range value. The range value can specify a distance between the electronic device and the mobile device. In various embodiments, the electronic device can calculate the range value and transmit the range value to the mobile device. Alternatively, the mobile device can calculate the range value and transmit the range value to the electronic device.

At 1204, the technique can include transmitting a ranging packet from the transmitting device via the wireless protocol. In some embodiments, the electronic device and transmit the ranging packet via UWB. The ranging packet can define a plurality of response slots in accordance with a transmission rate of the electronic device. The ranging packet can be transmitted by an antenna (e.g., a UWB antenna) of the electronic device (e.g., a smart speaker, a smart TV, a smart appliance, etc.).

At 1206, the technique can include receiving a response to the ranging packet based at least in part on the calculated range value. The response can be received by an antenna. The response can include an identifier of the mobile device that transmitted the response.

At 1208, the technique can include calculating a range value based at least in part on a transmission time and a reception time. In various embodiments, the range value can be calculated by first calculating a time difference between the reception time of the response and the transmission time of the request minus a processing time. The range can be determined by measured the time difference by the speed of light. The range value can be stored in a memory. During each ranging cycle both the mobile device and the electronic device can calculate the range value between the devices. In various alternate embodiments, the range value can be sent to the mobile device.

It should be appreciated that the specific steps illustrated in FIG. 12 provide particular techniques for passive beacon communication techniques according to various embodiments of the present disclosure. Other sequences of steps may also be performed according to alternative embodiments. For example, alternative embodiments of the present disclosure may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

In various embodiments, the electronic device can include one or more memories; and one or more processors in communication with the one or more memories and configured to execute instructions stored in the one or more memories to performing operations of the technique described above.

In various embodiments, a computer-readable medium storing a plurality of instructions that, when executed by one or more processors of a computing device, cause the one or more processors to perform operations of any of the techniques described above.

VI. Mobile Device for Performing Communications

Figure 13:
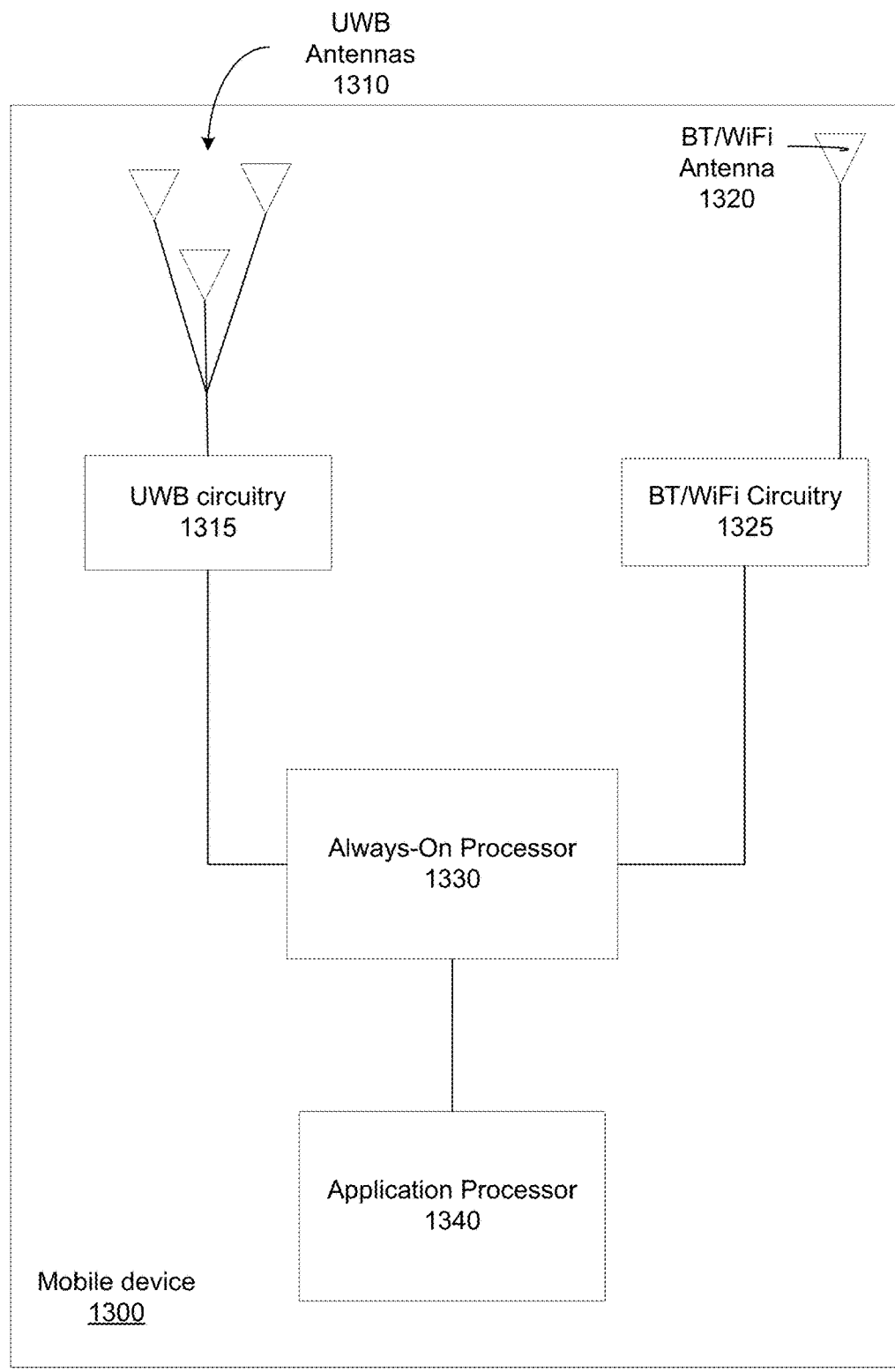
FIG. 13 is a block diagram of components of a mobile device operable to perform ranging according to embodiments of the present disclosure.

FIG. 13 is a block diagram of components of a mobile device 1300 operable to perform ranging techniques according to embodiments of the present disclosure. Mobile device 1300 includes one or more antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 1300 includes UWB antennas 1310 for performing ranging. UWB antennas 1310 are connected to UWB circuitry 1315 for analyzing detected signals from UWB antennas 1310. In some embodiments, mobile device 1300 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 1315 can communicate with an always-on processor (AOP) 1330, which can perform further processing using information from UWB messages. For example, AOP 1330 can perform the ranging calculations using timing data provided by UWB circuitry 1315. AOP 1330 and other circuits of the device can include dedicated circuitry and/or configurable circuitry, e.g., via firmware or other software.

As shown, mobile device 1300 also includes Bluetooth (BT)/Wi-Fi antenna 1320 for communicating data with other devices. Bluetooth (BT)/Wi-Fi antenna 1320 is connected to BT/Wi-Fi circuitry 1325 for analyzing detected signals from BT/Wi-Fi antenna 1320. For example, BT/Wi-Fi circuitry 1325 can parse messages to obtain data (e.g., an authentication tag), which can be sent on to AOP 1330. In some embodiments, AOP 1330 can perform authentication using an authentication tag. Thus, AOP 1330 can store or retrieve a list of authentication tags for which to compare a received tag against, as part of an authentication process. In some implementations, such functionality could be achieved by BT/Wi-Fi circuitry 1325.

In other embodiments, UWB circuitry 1315 and BT/Wi-Fi circuitry 1325 can alternatively or in addition be connected to application processor 1340, which can perform similar functionality as AOP 1330. Application processor 1340 typically requires more power than AOP 1330, and thus power can be saved by AOP 1330 handling certain functionality, so that application processor 1340 can remain in a sleep state, e.g., an off state. As an example, application processor 1340 can be used for communicating audio or video using BT/Wi-Fi, while AOP 1330 can coordinate transmission of such content and communication between UWB circuitry 1315 and BT/Wi-Fi circuitry 1325. For instance, AOP 1330 can coordinate timing of UWB messages relative to BT advertisements.

Coordination by AOP 1330 can have various benefits. For example, a first user of a sending device may want share content with another user, and thus ranging may be desired with a receiving device of this other user. However, if many people are in the same room, the sending device may need to distinguish a particular device among the multiple devices in the room, and potentially determine which device the sending device is pointing to. Such functionality can be provided by AOP 1330. In addition, it is not desirable to wake up the application processor of every other device in the room, and thus the Apo's of the other devices can perform some processing of the messages and determine that the destination address is for a different device.

To perform ranging, BT/Wi-Fi circuitry 1325 can analyze an advertisement signal from another device to determine that the other device wants to perform ranging, e.g., as part of a process for sharing content. BT/Wi-Fi circuitry 1325 can communicate this notification to AOP 1330, which can schedule UWB circuitry 1315 to be ready to detect UWB messages from the other device.

For the device initiating ranging, its AOP can perform the ranging calculations. Further, the AOP can monitor changes in distance between the other devices. For example, AOP 1330 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

VII. Example Device

Figure 14:
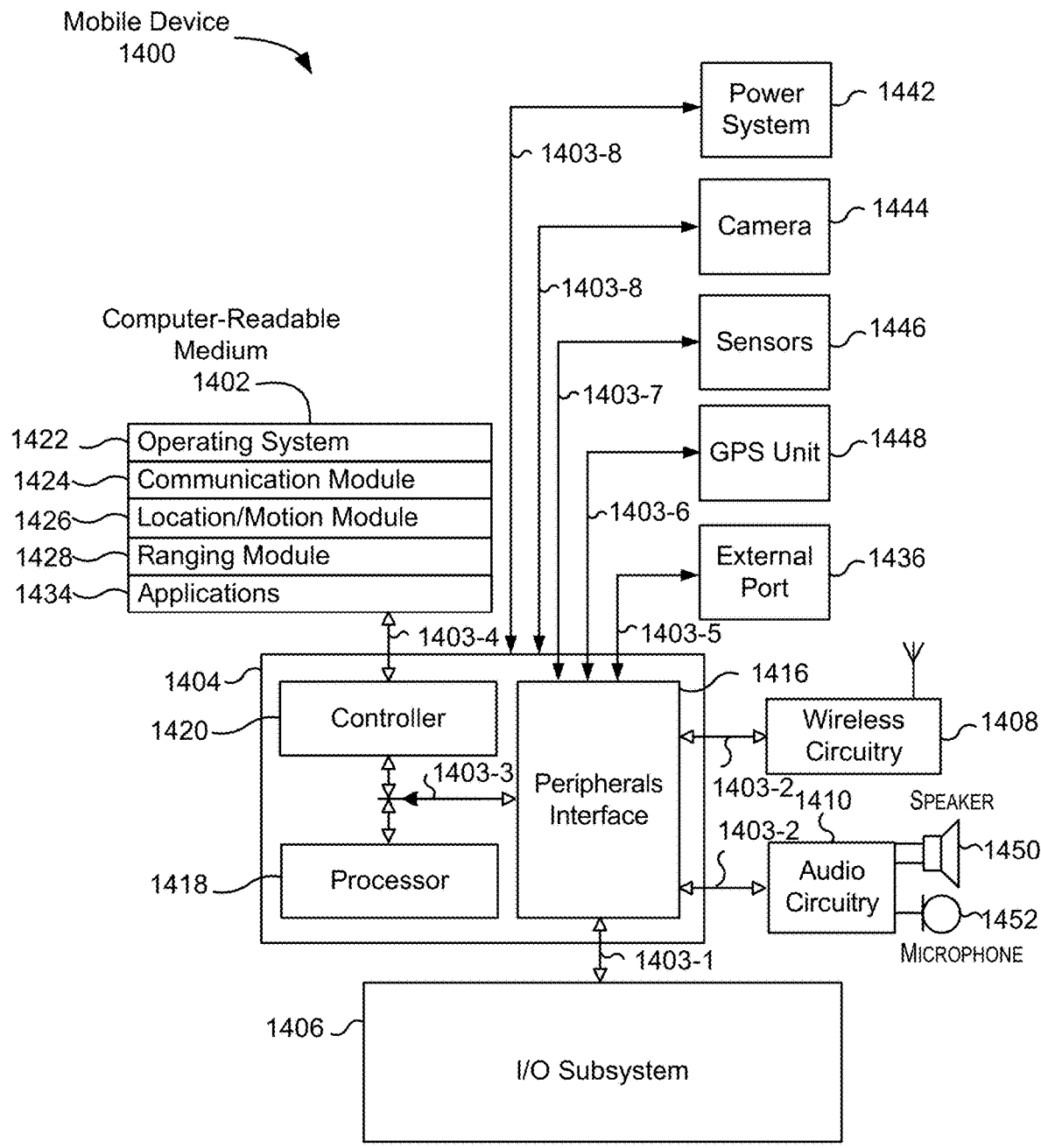
FIG. 14 is block diagram of an example device according to embodiments of the present disclosure.

FIG. 14 is a block diagram of an example electronic device 1400. Device 1400 generally includes computer-readable medium 1402, control circuitry 1404, an Input/output (I/O) subsystem 1406, wireless circuitry 1408, and audio circuitry 1410 including speaker 1450 and microphone 1452. These components may be coupled by one or more communication buses or signal lines 1403. Device 1400 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 14 is only one example of an architecture for device 1400, and that device 1400 can have more or fewer components than shown, or a different configuration of components. The various components shown in FIG. 14 can be implemented in hardware, software, or a combination of both hardware and software, including one or more signal processing and/or application specific integrated circuits.

Wireless circuitry 1408 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 1408 can use various protocols, e.g., as described herein. In various embodiments, wireless circuitry 1408 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1408 is coupled to control circuitry 1404 via peripherals interface 1416. Peripherals interface 1416 can include conventional components for establishing and maintaining communication between peripherals and voice and data information received by wireless circuitry 1408 (e.g., in speech recognition or voice command applications) is sent to one or more processors 1418 via peripherals interface 1416. One or more processors 1418 are configurable to process various data formats for one or more application programs 1434 stored on medium 1402.

Peripherals interface 1416 couple the input and output peripherals of device 1400 to the one or more processors 1418 and computer-readable medium 1402. One or more processors 1418 communicate with computer-readable medium 1402 via a controller 1420. Computer-readable medium 1402 can be any device or medium that can store code and/or data for use by one or more processors 1418. Computer-readable medium 1402 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs). In some embodiments, peripherals interface 1416, one or more processors 1418, and controller 1420 can be implemented on a single chip, such as control circuitry 1404. In some other embodiments, they can be implemented on separate chips.

Processor(s) 1418 can include hardware and/or software elements that perform one or more processing functions, such as mathematical operations, logical operations, data manipulation operations, data transfer operations, controlling the reception of user input, controlling output of information to users, or the like. Processor(s) 1418 can be embodied as one or more hardware processors, microprocessors, microcontrollers; field programmable gate arrays (FPGAs), application-specified integrated circuits (ASICs), or the like.

Device 1400 may include storage and processing circuitry such as control circuitry 1404. Control circuitry 1404 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 1404 may be used to control the operation of device 1400. This processing circuitry may be based on one or more microprocessors, microcontrollers, digital signal processors, baseband processor integrated circuits, application specific integrated circuits, etc.

Control circuitry 1404 may be used to run software on device 1400, such as internet browsing applications, voice-over-internet-protocol (VOIP) telephone call applications, email applications, media playback applications, operating system functions, etc. To support interactions with external equipment, control circuitry 1404 may be used in implementing communications protocols. Communications protocols that may be implemented using control circuitry 1404 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Device 1400 may include input-output subsystem 1406. Input-output subsystem 1406 may include input-output devices. Input-output devices may be used to allow data to be supplied to device 1400 and to allow data to be provided from device 1400 to external devices. Input-output devices may include user interface devices, data port devices, and other input-output components. For example, input-output devices may include one or more displays (e.g., touch screens or displays without touch sensor capabilities), one or more image sensors 1444 (e.g., digital image sensors), motion sensors, and speakers 1450. Input-output device may also include buttons, joysticks, scrolling wheels, touch pads, key pads, keyboards, microphones 1452, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Device 1400 also includes a power system 1442 for powering the various hardware components. Power system 1442 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1400 includes an image sensor 1444 (e.g., a camera). In some embodiments, device 1400 includes sensors 1446. Sensors can include accelerometers, compass, gyrometer, pressure sensors, audio sensors, light sensors, barometers, and the like. Sensors 1446 can be used to sense location aspects, such as auditory or light signatures of a location.

In some embodiments, device 1400 can include a GPS receiver, sometimes referred to as a GPS unit 1448. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1418 run various software components stored in medium 1402 to perform various functions for device 1400. In some embodiments, the software components include an operating system 1422, a communication module 1424 (or set of instructions), a location module 1426 (or set of instructions), a ranging module 1428 that is used as part of ranging operation described herein, and other application programs 1434 (or set of instructions).

Operating system 1422 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1424 facilitates communication with other devices over one or more external ports 1436 or via wireless circuitry 1408 and includes various software components for handling data received from wireless circuitry 1408 and/or external port 1436. External port 1436 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 1426 can assist in determining the current position (e.g., coordinates or other geographic location identifiers) and motion of device 1400. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1426 receives data from GPS unit 1448 and analyzes the signals to determine the current position of the mobile device. In some embodiments, location/motion module 1426 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1408 and is passed to location/motion module 1426. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1400 based on the position coordinates of the corresponding transmitters. Regardless of the specific location technology used, location/motion module 1426 receives information from which a location fix can be derived, interprets that information, and returns location information, such as geographic coordinates, latitude/longitude, or other location fix data Ranging module 1428 can send/receive ranging messages to/from an antenna, e.g., connected to wireless circuitry 1408. The messages can be used for various purposes, e.g., to identify a sending antenna of a device, determine timestamps of messages to determine a distance of mobile device 1400 from another device. Ranging module 1428 can exist on various processors of the device, e.g., an always-on processor (AOP), a UWB chip, and/or an application processor. For example, parts of ranging module 1428 can determine a distance on an AOP, and another part of the ranging module can interact with a sharing module, e.g., to display a position of the other device on a screen in order for a user to select the other device to share a data item. Ranging module 1428 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of device 1400 (e.g., portions of the display cover layer, portions of a plastic antenna window in a metal housing sidewall portion of housing, etc.). With one illustrative configuration, some or all of rear face of device 1400 may be formed from a dielectric. For example, the rear wall of housing may be formed from glass plastic, ceramic, other dielectric. In this type of arrangement, antennas may be mounted within the interior of device 1400 in a location that allows the antennas to transmit and receive antenna signals through the rear wall of device 1400 (and, if desired, through optional dielectric sidewall portions in housing). Antennas may also be formed from metal sidewall structures in housing and may be located in peripheral portions of device 1400.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas is being adversely affected due to the orientation of housing, blockage by a user's hand or other external object, or other environmental factors. Device 1400 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of device 1400 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in device 1400. As an example, antennas may be mounted at one or both ends of device 1400 (e.g., along the upper and lower edges of housing, at the corners of housing, etc.).

Antennas in device 1400 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 1400 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 1444 may include one or more visible digital image sensors (visible-light cameras) and/or one or more infrared digital image sensors (infrared-light cameras). Image sensors 1444 may, if desired, be used to measure distances. For example, an infrared time-of-flight image sensor may be used to measure the time that it takes for an infrared light pulse to reflect back from objects in the vicinity of device 1400, which may in turn be used to determine the distance to those objects. Visible imaging systems such as a front and/or rear-facing camera in device 1400 may also be used to determine the position of objects in the environment. For example, control circuitry 1404 may use image sensors 1444 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 1404 may rely entirely upon image sensors 1444 to perform simultaneous localization and mapping, or control circuitry 1404 may synthesize image data with range data from one or more distance sensors (e.g., light-based proximity sensors). If desired, control circuitry 1404 may use display to display a visual representation of the mapped environment.

Input-output devices may include motion sensor circuitry 1446. Motion sensor circuitry 1446 may include one or more accelerometers (e.g., accelerometers that measure acceleration along one, two, or three axes), gyroscopes, barometers, magnetic sensors (e.g., compasses), image sensors (e.g., image sensor 1444) and other sensor structures. Sensors 1446 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 1404 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 1404. Movement generation circuitry may include electromechanical actuator circuitry that, when driven, moves device 1400 in one or more directions. For example, movement generation circuitry may laterally move device 1400 and/or may rotate device 1400 around one or more axes of rotation. Movement generation circuitry may, for example, include one or more actuators formed at one or more locations of device 1400. When driven by a motion control signal, actuators may move (e.g., vibrate, pulse, tilt, push, pull, rotate, etc.) to cause device 1400 to move or rotate in one or more directions. The movement may be slight (e.g., not noticeable or barely noticeable to a user of device 1400), or the movement may be substantial. Actuators may be based on one or more vibrators, motors, solenoids, piezoelectric actuators, speaker coils, or any other desired device capable of mechanically (physically) moving device 1400.

Some or all of movement generation circuitry such as actuators may be used to perform operations that are unrelated to rotation of device 1400. For example, actuators may include vibrators that are actuated to issue a haptic alert or notification to a user of device 1400. Such alerts may include, for example, a received text message alert identifying that device 1400 has received a text message, a received telephone call alert, a received email alert, an alarm notification alert, a calendar notification alert, or any other desired notification. By actuating actuator, device 1400 may inform the user of any desired device condition.

Motion sensor circuitry may sense motion of device 1400 that is generated by movement generation circuitry. If desired, motion sensor circuitry may provide feedback signals associated with the sensed motion of device 1400 to movement generation circuitry. Movement generation circuitry may use the feedback signals to control actuation of the movement generation circuitry.

Control circuitry 1404 may use motion sensor circuitry and/or movement generation circuitry to determine the angle of arrival of wireless signals received by device 1400 from another electronic device. For example, control circuitry 1404 may use movement generation circuitry to move device 1400 from one position to another. Motion sensor circuitry may be used to track the movement of device 1400 as it is moved between the different positions. At each position, control circuitry 1404 may receive wireless signals from another electronic device. Control circuitry 1404 may process the received wireless signals together with the motion data from motion sensor circuitry to more accurately determine the position of the other electronic device. The use of motion generation circuitry is merely illustrative, however. If desired, motion sensor circuitry may track movement of device 1400 that is not caused by motion generation circuitry. This may include a user's natural, unprompted movement of device 1400 and/or the user's movement of device 1400 after the user is prompted (by display, audio circuitry 1410, a haptic output device in device 1400, or any other suitable output device) to move device 1400 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 1408 may include radio-frequency transceiver circuitry for handling various radio-frequency communications bands. For example, circuitry 1408 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLObal NAvigation Satellite System (GLONASS) signals at 1609 MHz). Satellite navigation system signals for receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 1400 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 1434 on device 1400 can include any applications installed on the device 1400, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1406 can be coupled to a display system (not shown), which can be a touch-sensitive display. The display displays visual output to the user in a graphical user interface (GUI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1406 can include a display and user input devices such as a keyboard, mouse, and/or trackpad. In some embodiments, I/O subsystem 1406 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1402) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1406 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1400 can include a touchpad (not shown) for activating or deactivating particular functions. In some embodiments, the touchpad is a touch-sensitive area of the device 1400 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of ranging with an electronic device by a mobile device, the method comprising performing, by the mobile device:
    performing ranging with the electronic device with via a wireless protocol to determine a range value, wherein the range value specifies a distance between the electronic device and the mobile device;
    receiving a ranging packet from the electronic device via the wireless protocol, the ranging packet defining a plurality of ranging response slots in accordance with a transmission rate of the ranging packets of the electronic device;
    selecting a response rate corresponding to a ranging response slot of the plurality of ranging response slots based on the range value, the selected response rate corresponding to a first rate that is lower than the transmission rate of the ranging packets by skipping one or more response periods for one or more received ranging packets; and
    transmitting, to the electronic device, a ranging response during the selected ranging response slot.

2. The method of claim 1, wherein the ranging comprises:
    the ranging packet that was transmitted at a first time from the electronic device via the wireless protocol;
    transmitting a response message from the mobile device at a second time; and
    calculating the range value between the mobile device and the electronic device based on a difference between the first time and the second time.

3. The method of claim 1, wherein the selecting the ranging response slot comprises:
    comparing the range value against one or more predetermined thresholds; and
    selecting the ranging response slot based on the range value being less than the one or more predetermined thresholds.

4. The method of claim 1, further comprising:
determining the range value has changed to be within a new threshold, and
selecting an earlier ranging response slot to increase a rate of ranging.

5. The method of claim 1, further comprising:
determining a state of the mobile device, wherein the state comprises one of awake or asleep; and
selecting the ranging response slot of the plurality of ranging response slots based at least in part on the state of the mobile device.

6. The method of claim 1, further comprising:
determining a state of an application of the mobile device, wherein the state comprises one of active or inactive; and
selecting the ranging response slot of the plurality of ranging response slots based at least in part on the state of the application of the mobile device.

7. The method of claim 1, further comprising:
determining a motion of the mobile device; and
selecting the ranging response slot of the plurality of ranging response slots based at least in part on the motion of the mobile device being below a threshold, the selected ranging response slot corresponding to a first rate lower than the transmission rate of the electronic device.

8. The method of claim 1, further comprising:
determining an orientation of the mobile device with respect to the electronic device; and
selecting the ranging response slot of the plurality of ranging response slots based at least in part on the orientation of the mobile device pointing within a predetermined angular range, the selected ranging response slot corresponding to a first rate lower than the transmission rate of the electronic device.

9. The method of claim 1, further comprising:
generating a user interface for the electronic device; and
displaying the user interface based on the range value.

10. The method of claim 1, further comprising:
determining an orientation of the mobile device, the orientation determining if a face of the mobile device is faceup or facedown with respect to the electronic device; and
selecting the ranging response slot of the plurality of ranging response slots based at least in part on the orientation of the mobile device being facedown, the selected ranging response slot corresponding to a first rate lower than the transmission rate of the electronic device.

11. A mobile device, comprising:
a processor; and
a memory coupled to the processor, the memory storing instructions, which when executed by the processor, cause the mobile device to perform operations including:
performing ranging with an electronic device with via a wireless protocol to determine a range value, wherein the range value specifies a distance between the electronic device and the mobile device;
receiving a ranging packet from the electronic device via the wireless protocol, the ranging packet defining a plurality of ranging response slots in accordance with a transmission rate of the ranging packets of the electronic device;
selecting a response rate corresponding to a ranging response slot of the plurality of ranging response slots based at least in part on the range value, the selected response rate corresponding to a first rate lower than the transmission rate of the ranging packets by skipping one or more ranging response periods for one or more received ranging packets; and
transmitting a second response during the selected ranging response slot.

12. The mobile device of claim 11, wherein the selecting the ranging response slot comprises:
comparing the range value against one or more predetermined thresholds; and
selecting the ranging response slot based on the range value being less than the one or more predetermined thresholds.

13. The mobile device of claim 11, further comprising:
determining the range value has changed to be within a new threshold, and
selecting an earlier ranging response slot to increase a rate of ranging.

14. The mobile device of claim 11, wherein the ranging comprises:
transmitting a ranging packet at a first time via a wireless protocol;
receiving a response message from the electronic device at a second time; and
calculating a range value between the mobile device and the electronic device based on a difference between the first time and the second time.

15. The mobile device of claim 11, wherein the operations further include:
determining a state of the mobile device, wherein the state comprises one of awake or asleep; and
selecting the ranging response slot of the plurality of ranging response slots based at least in part on the state of the mobile device, the selected ranging response slot corresponding to a first rate lower than the transmission rate of the electronic device.

16. The mobile device of claim 11, wherein the operations further include:
determining a state of an application of the mobile device, wherein the state comprises one of active or inactive; and
selecting the ranging response slot of the plurality of ranging response slots based at least in part on the state of the application of the mobile device, the selected ranging response slot corresponding to a first rate lower than the transmission rate of the electronic device.

17. The mobile device of claim 11, wherein the operations further include:
determining a motion of the mobile device; and
selecting the ranging response slot of the plurality of ranging response slots based at least in part on the motion of the mobile device being below a threshold, the selected ranging response slot corresponding to a first rate lower than the transmission rate of the electronic device.

18. The mobile device of claim 11, wherein the operations further include:
determining an orientation of the mobile device with respect to the electronic device; and
selecting the ranging response slot of the plurality of ranging response slots based at least in part on the orientation of the mobile device pointing within a predetermined angular range, the selected ranging response slot corresponding to a first rate lower than the transmission rate of the electronic device.

\* \* \* \* \*